(12) United States Patent  
Hasegawa et al.

(10) Patent No.: US 7,360,613 B2
(45) Date of Patent: Apr. 22, 2008

(54) TRANSMISSION FOR SPEED CHANGING AND STEERING OF A VEHICLE

(75) Inventors: Toshiyuki Hasegawa, Morristown, TN (US); Travis S. McCloud, Morristown, TN (US); Keith J. Andrews, Morristown, TN (US); Robert Abend, Morristown, TN (US)

(73) Assignee: Tuff Torq Corporation, Morristown, TN (US)

( * ) Notice: Subject to any disclaimer, the term of this patent is extended or adjusted under 35 U.S.C. 154(b) by 0 days.

(21) Appl. No.: 11/418,068

(22) Filed: May 5, 2006

(65) Prior Publication Data

US 2006/0196719 A1    Sep. 7, 2006

Related U.S. Application Data

(63) Continuation of application No. 10/852,265, filed on May 25, 2004, now Pat. No. 7,059,433, which is a continuation of application No. 10/274,942, filed on Oct. 22, 2002, now Pat. No. 6,755,264, which is a continuation of application No. 09/700,923, filed as application No. PCT/US98/20166 on Sep. 25, 1998, now Pat. No. 6,540,633.

(51) Int. Cl.
*B62D 11/00* (2006.01)
(52) U.S. Cl. .................. 180/6.2; 180/6.44; 180/6.48
(58) Field of Classification Search ............. 180/6.2, 180/6.24, 6.44, 6.48, 23, 6.26, 6.32, 6.62, 180/6.66, 24.12
See application file for complete search history.

(56) References Cited

U.S. PATENT DOCUMENTS

| | | | |
|---|---|---|---|
| 168,955 A | 10/1875 | Annin |
| 1,476,068 A | 12/1923 | Froelich |
| 1,748,061 A | 2/1930 | Claude |
| 2,191,961 A | 2/1940 | Howell |
| 2,255,348 A | 9/1941 | Brown |
| 2,311,922 A | 2/1943 | Allin |
| 2,332,838 A | 10/1943 | Borgward |
| 2,336,911 A | 12/1943 | Zimmerman |

(Continued)

FOREIGN PATENT DOCUMENTS

CH          249274         6/1947

(Continued)

OTHER PUBLICATIONS

Excel Industries Inc., "U-T-R The Ultimate Turning Radius," pp. 1-6, Dec. 1992.

(Continued)

*Primary Examiner*—Christopher Bottorff
(74) *Attorney, Agent, or Firm*—Sterne, Kessler, Goldstein & Fox P.L.L.C.

(57) ABSTRACT

A transmission for speed changing and steering of a vehicle comprises a first HST and a first differential for speed changing and a second HST and a second differential for steering. The first HST is a combination of a hydraulic pump and motor. The pump is driven by an engine and the motor is drivingly changeable by operation of a speed change pedal. Output power from the motor is transmitted into a pair of first differential output shafts as axles through the first differential. The second HST is a combination of a hydraulic pump and motor. The second pump is driven by output power from the first HST and the second motor is drivingly changeable by operation of a steering wheel. A pair of second differential output shafts are rotated in opposite directions by output power of the motor, so that when turning, the first differential output shaft on the opposite side of the turning direction is accelerated.

20 Claims, 16 Drawing Sheets

U.S. PATENT DOCUMENTS

| | | |
|---|---|---|
| 2,336,912 A | 12/1943 | Zimmerman |
| 2,391,735 A | 12/1945 | Orshansky, Jr. |
| 2,530,720 A | 11/1950 | Paulson |
| 2,745,506 A | 5/1956 | McCallum |
| 2,763,164 A | 9/1956 | Neklutin |
| 2,789,646 A | 4/1957 | Bobard |
| 2,936,033 A | 5/1960 | Gates |
| 3,059,416 A | 10/1962 | Campbell |
| 3,315,759 A | 4/1967 | Bohlen |
| 3,371,734 A | 3/1968 | Zaunberger |
| 3,376,760 A | 4/1968 | Gordanier |
| 3,395,671 A | 8/1968 | Zimmerman |
| 3,450,218 A | 6/1969 | Looker |
| 3,477,225 A | 11/1969 | Cryder et al. |
| 3,492,891 A | 2/1970 | Livezey |
| 3,530,741 A | 9/1970 | Charest |
| 3,545,303 A | 12/1970 | Whelahan |
| 3,575,066 A | 4/1971 | Livezey et al. |
| 3,575,254 A | 4/1971 | Sipos |
| 3,590,658 A | 7/1971 | Tuck |
| 3,596,535 A | 8/1971 | Polak |
| 3,603,176 A | 9/1971 | Tipping et al. |
| 3,612,199 A | 10/1971 | Vissers |
| 3,717,212 A | 2/1973 | Potter |
| 3,796,275 A | 3/1974 | Bouyer |
| 3,833,078 A | 9/1974 | Chaney et al. |
| 3,869,014 A | 3/1975 | Federspiel et al. |
| 3,884,320 A | 5/1975 | Auguste Levieau |
| 3,901,339 A | 8/1975 | Williamson |
| 3,903,977 A | 9/1975 | Gillette et al. |
| 3,907,051 A | 9/1975 | Weant et al. |
| 3,966,005 A | 6/1976 | Binger |
| 3,978,937 A | 9/1976 | Chichester et al. |
| 4,013,301 A | 3/1977 | Gaskin |
| 4,087,970 A | 5/1978 | Slazas et al. |
| 4,133,404 A | 1/1979 | Griffin |
| 4,164,156 A | 8/1979 | Reed |
| 4,174,762 A | 11/1979 | Hopkins et al. |
| 4,245,524 A | 1/1981 | Dammon |
| 4,281,737 A | 8/1981 | Molzahn |
| 4,293,050 A | 10/1981 | Goloff et al. |
| 4,320,810 A | 3/1982 | Hillmann et al. |
| 4,368,798 A | 1/1983 | Meyerle et al. |
| 4,399,882 A | 8/1983 | O'Neill et al. |
| 4,402,181 A | 9/1983 | Acker et al. |
| 4,471,669 A | 9/1984 | Seaberg |
| 4,569,251 A | 2/1986 | Greenwood |
| 4,572,310 A | 2/1986 | Peter |
| 4,577,711 A | 3/1986 | Butler |
| 4,620,575 A | 11/1986 | Cuba et al. |
| 4,631,980 A | 12/1986 | Ishimori |
| 4,700,794 A | 10/1987 | Bernhagen et al. |
| 4,718,508 A | 1/1988 | Tervola |
| 4,729,257 A | 3/1988 | Nelson |
| 4,732,053 A | 3/1988 | Gleasman et al. |
| 4,738,328 A * | 4/1988 | Hayden ............... 180/307 |
| 4,776,235 A | 10/1988 | Gleasman et al. |
| 4,776,236 A | 10/1988 | Gleasman et al. |
| 4,782,650 A | 11/1988 | Walker |
| 4,790,399 A * | 12/1988 | Middlesworth ............ 180/6.2 |
| 4,807,904 A | 2/1989 | Kamlukin et al. |
| 4,809,796 A | 3/1989 | Yamaoka et al. |
| 4,813,506 A | 3/1989 | Smith |
| 4,870,820 A | 10/1989 | Nemoto |
| 4,875,536 A | 10/1989 | Saur et al. |
| 4,882,947 A | 11/1989 | Barnard |
| 4,886,142 A | 12/1989 | Yamaoka et al. |
| 4,890,508 A | 1/1990 | Zaunberger |
| 4,895,052 A | 1/1990 | Gleasman et al. |
| 4,914,907 A | 4/1990 | Okada |
| 4,917,200 A | 4/1990 | Lucius |
| 4,932,209 A | 6/1990 | Okada et al. |
| 4,949,823 A | 8/1990 | Coutant et al. |
| 4,977,760 A | 12/1990 | Ishimori et al. |
| 5,004,060 A | 4/1991 | Barbagli et al. |
| 5,015,221 A | 5/1991 | Smith |
| 5,026,333 A | 6/1991 | Meyerle |
| 5,042,238 A | 8/1991 | White, III et al. |
| 5,052,511 A | 10/1991 | Hunt |
| 5,056,615 A | 10/1991 | Duthie et al. |
| 5,094,326 A | 3/1992 | Schemelin et al. |
| 5,131,483 A | 7/1992 | Parkes |
| 5,137,100 A | 8/1992 | Scott et al. |
| RE34,057 E | 9/1992 | Middlesworth |
| 5,146,748 A | 9/1992 | Okada |
| 5,154,437 A | 10/1992 | Inagaki et al. |
| 5,195,600 A | 3/1993 | Dorgan |
| 5,201,240 A | 4/1993 | Hayes et al. |
| 5,215,056 A | 6/1993 | Harada et al. |
| 5,247,784 A | 9/1993 | Kitamura et al. |
| 5,279,376 A | 1/1994 | Yang et al. |
| 5,285,866 A | 2/1994 | Ackroyd |
| 5,307,612 A | 5/1994 | Tomiyama et al. |
| 5,311,957 A | 5/1994 | McLaurin et al. |
| 5,314,387 A | 5/1994 | Hauser et al. |
| 5,335,739 A | 8/1994 | Pieterse et al. |
| 5,339,631 A | 8/1994 | Ohashi |
| 5,355,661 A | 10/1994 | Tomiyama |
| 5,367,861 A * | 11/1994 | Murakawa et al. ........... 56/11.8 |
| 5,383,528 A | 1/1995 | Nicol |
| 5,387,161 A | 2/1995 | Shibahata |
| 5,505,279 A | 4/1996 | Louis et al. |
| 5,507,138 A | 4/1996 | Wright et al. |
| 5,509,496 A | 4/1996 | Erickson et al. |
| 5,511,631 A | 4/1996 | Tsuchihashi et al. |
| 5,517,809 A | 5/1996 | Rich |
| 5,529,135 A | 6/1996 | Wenzel et al. |
| 5,535,840 A | 7/1996 | Ishino et al. |
| 5,553,453 A | 9/1996 | Coutant et al. |
| 5,560,447 A | 10/1996 | Ishii et al. |
| 5,564,518 A | 10/1996 | Ishii et al. |
| 5,569,109 A | 10/1996 | Okada |
| 5,644,903 A | 7/1997 | Davis, Jr. |
| 5,649,606 A | 7/1997 | Bebernes et al. |
| 5,667,032 A | 9/1997 | Kamlukin |
| 5,706,907 A | 1/1998 | Unruh |
| 5,722,501 A | 3/1998 | Finch et al. |
| 5,775,437 A | 7/1998 | Ichikawa et al. |
| 5,782,142 A | 7/1998 | Abend et al. |
| 5,823,285 A | 10/1998 | Tsuchihashi et al. |
| 5,842,378 A | 12/1998 | Zellmer |
| 5,850,886 A | 12/1998 | Kouno et al. |
| 5,887,671 A | 3/1999 | Yuki et al. |
| 5,894,907 A | 4/1999 | Peter |
| 5,910,060 A | 6/1999 | Blume |
| 5,911,669 A | 6/1999 | Stentz et al. |
| 5,913,802 A | 6/1999 | Mullet et al. |
| 5,946,894 A | 9/1999 | Eavenson et al. |
| 5,947,219 A | 9/1999 | Peter et al. |
| 5,975,224 A | 11/1999 | Satzler |
| 5,997,425 A | 12/1999 | Coutant et al. |
| 6,026,634 A | 2/2000 | Peter et al. |
| 6,029,761 A | 2/2000 | Gustafson et al. |
| 6,032,751 A | 3/2000 | Loichinger et al. |
| 6,035,959 A | 3/2000 | Schaedler |
| 6,038,840 A | 3/2000 | Ishimori et al. |
| 6,082,084 A | 7/2000 | Reimers et al. |
| 6,098,386 A | 8/2000 | Shimizu et al. |
| 6,098,737 A | 8/2000 | Aoki |
| 6,098,740 A | 8/2000 | Abend et al. |
| 6,126,564 A | 10/2000 | Irikura et al. |
| 6,129,164 A | 10/2000 | Teal et al. |
| 6,141,947 A | 11/2000 | Borling |
| 6,152,248 A | 11/2000 | Hidaka et al. |

| | | | | | | |
|---|---|---|---|---|---|---|
| 6,189,641 | B1 | 2/2001 | Azuma | JP | 9216522 | 8/1997 |
| 6,196,342 | B1 | 3/2001 | Teal et al. | JP | 10095360 | 4/1998 |
| 6,196,348 | B1 | 3/2001 | Yano et al. | WO | WO 92/12889 | 8/1992 |
| 6,257,357 | B1 | 7/2001 | Teal et al. | WO | WO 98/12098 | 3/1998 |
| 6,260,641 | B1 | 7/2001 | Hidaka | WO | WO 98/32645 | 7/1998 |
| 6,276,468 | B1 | 8/2001 | Essig et al. | WO | WO 99/40499 | 8/1999 |
| 6,283,236 | B1 | 9/2001 | Teal et al. | WO | WO 00/01569 | 1/2000 |
| 6,312,354 | B1 | 11/2001 | Irikura et al. | WO | WO 00/19127 | 4/2000 |
| 6,336,513 | B1 | 1/2002 | Hasegawa et al. | | | |
| 6,354,388 | B1 | 3/2002 | Teal et al. | | | |
| 6,381,529 | B1 | 4/2002 | Misty | | | |
| 6,390,227 | B1 | 5/2002 | Abend et al. | | | |
| 6,397,966 | B1 | 6/2002 | Irikura et al. | | | |
| 6,447,419 | B1 | 9/2002 | Irikura | | | |
| 6,454,032 | B1 | 9/2002 | Teal et al. | | | |
| 6,478,706 | B1 | 11/2002 | Crabb | | | |
| 6,484,827 | B2 | 11/2002 | Teal et al. | | | |
| 6,524,205 | B1 | 2/2003 | Irikura | | | |
| 6,540,633 | B1 | 4/2003 | Hasegawa et al. | | | |
| 6,543,548 | B1 | 4/2003 | Ichikawa et al. | | | |
| 6,547,685 | B2 | 4/2003 | Kawada | | | |
| 6,554,085 | B2 | 4/2003 | Hasegawa | | | |
| 6,629,577 | B1 | 10/2003 | Abend | | | |
| 6,644,429 | B2 | 11/2003 | Evans et al. | | | |
| 6,755,264 | B2 | 6/2004 | Hasegawa et al. | | | |
| 6,951,259 | B2 | 10/2005 | Irikura | | | |
| 7,040,445 | B2 | 5/2006 | Ishii et al. | | | |

FOREIGN PATENT DOCUMENTS

| | | |
|---|---|---|
| DE | 4224887 A1 | 9/1993 |
| EP | 0 927 679 A1 | 7/1999 |
| FR | 1147142 | 11/1957 |
| FR | 806337 A1 | 11/1997 |
| GB | 2303829 A | 3/1997 |
| JP | 54027130 | 3/1979 |
| JP | 57140277 | 8/1982 |
| JP | 63227476 | 9/1988 |
| JP | 1160783 | 6/1989 |
| JP | 2261952 | 10/1990 |
| JP | 6264976 | 9/1994 |
| JP | 8142906 | 6/1996 |
| JP | 9202255 | 8/1997 |
| JP | 9202258 | 8/1997 |
| JP | 9202259 | 8/1997 |

OTHER PUBLICATIONS

Electric Tractor Corporation, "An Idea Whose Time Has Come," 5 pages, date of publication unknown, published in Ontario, Canada.
Electric Tractor Corporation, Model #9620- The Ultimate Lawn and Garden Tractor, 6 pages, printed, Jul. 27, 1998.
Farm Show Magazine, "Battery Powered Riding Mower," 1 page, date of publication, Mar.-Apr. 1996.
Deere & Company, "240, 245, 260, 265, 285 and 320 Lawn and Garden Tractors, Technical Manual," front cover and pp. 10-2 to 10-4 and 10-6, dated Sep. 26, 1996.
Excel Industries, Inc., "Hustler 4000 Series," product brochure, pp. 1-8, Dec. 1995.
Woods Equipment Company, "Woods Mow'n Machine," product brochure, pp. 1-12, Dec. 1997.
Ex-Mark, "ExMark Nobody Does It Better—Professional Turf Care Equipment," pp. 1-20, Dec. 1997.
Dixon Industries, Inc., "Dixon ZTR Riding Mowers," pp. 1-4, Dec. 1997.
Shivers Mfg., "Zero Turn Radius Mower—The Commercial Clipper,", pp. 1-4, Dec. 1997.
Ogorkiewicz, R. M., "Tank Steering Mechanisms," The Engineer, pp. 337-340, Mar. 3, 1967.
Ferris Industries Inc., "The ProCut Z Zero-Turn Rider," pp. 1-2, Dec. 1997.
Zipper-TS Mower, "The Zipper-TS Mowers," pp. 1-2, 1997.
Westwood, "The Westwood Clipper Owners Instruction Manual," pp. 1-17 and 19, date of publication unknown.
Brochure regarding differential steering, pp. 4-15, date of publication unknown.
Bargo, Michael, Jr,, "Tanks And Dozers Turn On A Dime With New All Gear Steering," *Popular Science*, pp. 60-62, Jul. 1985.
Article regarding Differential Steering, Jul. 1985, p. 61.
Supplementary European Search Report For International Appl. No. PCT/US9820166, European Patent Office, dated Feb. 16, 2007.

\* cited by examiner

TRANSMISSION FOR SPEED CHANGING AND STEERING OF A VEHICLE

BACKGROUND OF THE INVENTION

1. Field of the Invention

The present invention relates to a transmission for driving left and right axles of a vehicle comprising a pair of hydrostatic transmissions (to be referred to as HSTs), each of which is a fluid combination of a hydraulic pump and a hydraulic motor, wherein one of the HSTs is provided for speed change in advancing and reversing and the other is for steering.

2. Related Art

U.S. Pat. No. 4,782,650, for example, describes a vehicle provided with a pair of HSTs disposed in a lateral row and connected with each other, with left and right axles projecting laterally outward from its respective HST. Driving wheels are fixed onto utmost ends of the axles. The left and right axles are driven by changing the angles of slant of movable swash plates provided for the its respective left or right HST.

The left and right axles are driven at the same speed by the pair of HSTs when the vehicle is advancing or reversing in a straight line. They are driven at different speeds when turning.

However, the above mentioned conventional vehicle can advance or reverse straight only when the output rotational speeds of the pair of the HSTs are equal. Thus, equalization of the output speed of each of the HSTs is required. This equalization takes a long time during operation of the vehicle. Additionally, accuracy is required when manufacturing and assembling the components of each HST. If there is any difference in volume of the hydraulic pumps or motors between the HSTs, the feeling in turning left and right are different from each other, thereby making the vehicle difficult to control.

Furthermore, a speed changing operating tool, such as a speed change pedal, is connected to both output speed changing members, such as a movable swash plates, of the pair of HSTs. A steering operating tool, such as a steering wheel, is also connected to both members. This arrangement requires complicated linkages interposed between the speed changing operating tool and the both speed changing members and between the steering operating tool and both speed changing members, thereby increasing the manufacturing cost of the linkages and the space for disposal thereof in the vehicle.

If one HST is provided for speed change in traveling and another is provided for steering, each of the operating tools for speed changing and steering need only be connected with one output speed changing member of either of the HSTs, thereby simplifying the linkages between the operating tools and the speed changing members and reducing the manufacturing cost and the space required for disposal thereof.

However, the transmission for speed changing and steering must be capable of turning along a small radius if it is employed by a working vehicle like a mower tractor required to travel among trees. It also must be compact if it is provided for a small vehicle.

Furthermore, it is required to be capable of being operated for speed changing and steering as easily and sensitively as a passenger car.

It is also desirable that the transmission's activity in turning corresponds to the traveling speed to improve the sensitivity of the steering operation. Moreover, it is desired for safety and efficiency of work that when the same degree of steering operation is employed, the vehicle provided with the transmission turns along a small radius when traveling slowly and turns along a large radius when traveling fast.

SUMMARY OF THE INVENTION

A transmission for steering and speed changing of a vehicle in accordance with the present invention comprises a first HST including a hydraulic pump and a hydraulic motor for speed changing for advancing and reversing and a second HST including a hydraulic pump and a hydraulic motor for steering. The first HST is driven by a prime mover. Output power of the first HST is transmitted into a pair of axles through a differential and is also transmitted into the second HST.

Since the transmission is so constructed, the pair of HSTs can be driven by the single prime mover, so that only one input means, for example, an input shaft, of the first HST is needed to receive the output power of the prime mover. Also, since speed changing is provided only by the single first HST, and steering is provided by only the single second HST, the oil circuits thereof can be simplified and the manufacturing cost can be reduced. The transmission does not need complicated equalization of output power between the two HSTs when advancing or reversing in a straight line as in conventional dual HST arrangements. Moreover, since the wheels connected to the axles are used for both traveling and steering, the vehicle can employ simple follower wheels such as casters, thereby having a small turning radius and reducing the manufacturing cost.

For braking the axles, a brake device can be provided on any rotational member in the transmitting system for speed changing in traveling between an input side of the first HST and the axles. This provides flexibility in choosing the optimal position for placement of the brake device in order to provide a compact transmission.

An output speed changing member of the first HST is connected with a speed changing operating tool provided on a vehicle, so that the rotary speed of the motor of the first HST is steplessly changeable by operation of the tool, whereby the traveling speed of the vehicle can be steplessly controlled. Also, the connection between the speed changing operating tool and the output speed changing means is simpler in comparison with the conventional connection between a steering operating tool and a pair of output speed changing members of two HSTs.

Regarding the transmitting system for steering, the second HST driven by the first HST has a pair of output means, which rotate in opposite directions, by output of the motor of the second HST. The pair of output means are drivingly connected with the pair of axles. An output speed changing member of the second HST is connected with a steering operating tool provided on the vehicle, so that the rotary speed of the motor of the second HST is steplessly changeable by operation of the steering operating tool. The connection between the steering operating tool and the output speed changing means is simpler in comparison with the conventional connection between a steering operating tool and a pair of output speed changing members of two HSTs.

In this construction, when the steering operating tool is operated for turning, the motor of the second HST is driven so as to rotate the output means of the second HST in opposite directions. Accordingly, one of the axles is accelerated and the other is decelerated, so that the vehicle turns to the side of the decelerated axle.

Since the rotational direction of the pump of the second HST is reversed according to reversing the motor of the first HST when the vehicle travels in reverse, the turning direction of the vehicle can coincide with the same direction of operation of the steering operating tool in both cases of advancing and reversing. This arrangement therefore does not require a mechanism for coinciding the turning direction of the vehicle with the operational direction of the steering operating tool when in reverse. Thus, the vehicle employing the transmission can be steered as easily as a passenger car.

Also, since the rotary speed of the pump of the second HST is increased in proportion to that of the motor of the first HST, the replication of turning to the steering operation can be more sensitive in proportion to traveling speed. Thus, the vehicle can be nicely steered because it is prevented from delay in turning in relation to the steering operation. Moreover, the pump of the second HST for steering is stopped when the vehicle is stopped because the second HST is driven by output power of the first HST for speed changing. Thus, the vehicle is safe from unexpected start even if an operator touches the steering operating tool on the stopped vehicle.

With regard to the differential connected with the axles, it may constitute a pair of planetary gears. In this case, the output means of the second HST is drivingly connected with the pair of planetary gears. Due to this construction, the pair of planetary of gears as the differential can be narrowed and made more compact because of omission of a differential casing.

With regard to the connection between the steering operating tool and the output speed changing member of the second HST, it may be constructed such that the member is moved at a small rate of speed relative to an operational degree of the tool when the member is in vicinity of its neutral position. This construction allows the vehicle to travel straight even if the steering operating tool is slightly moved from its straight traveling position, and it turns gradually on steering of the steering operation for turning.

For the purpose of providing a changeable turning circle in correspondence to traveling speed, the transmission employs either of the following two constructions.

A first linkage, which has a pair of fixed pivotal points and an intermediate movable pivotal point between the fixed pivotal points, is interposed between the steering operating tool and the output speed changing member of the second HST. A second linkage is interposed between the speed changing operating tool and the movable pivotal point. The first linkage is bendable at the movable pivotal point thereof in correspondence to the steering operation. The second linkage moves the movable pivotal point in correspondence to the speed changing operation so as to change a ratio of a distance between one fixed pivotal point and the movable pivotal point to that between the other fixed pivotal point and the movable pivotal point, whereby the output rotational speed of the second HST is reduced in inverse proportion to the traveling speed.

Alternatively, the pump of the first HST is of variable capacity type and the motor thereof is of fixed capacity type and both of the pump and the motor of the second HST are of variably capacity types. A first capacity changing means of the pump of the first HST is connected with a second capacity changing means of the motor of the second HST, so that the rotary speed of the motor is reduced in inverse proportion to that of the pump.

In either construction, when the steering operating tool is operated to the same degree, the turning radius of the vehicle is large when traveling fast and is small when traveling slowly. The vehicle is safe from sudden turning when traveling fast, and it can turn rapidly by small steering operation when traveling slowly.

With regard to disposal of the first and second HSTs in relation to the housing containing the differential, the axles and the gear trains between the differential and the axles therein, the HSTs may be provided outside the housing, thereby enabling the HSTs to be easily attached and removed or assembled and disassembled independently of the settled housing.

Alternatively, the first and second HST may be contained within the housing, thereby providing a more compact, lighter transmission with reduced manufacturing cost in comparison with that provided with other housings for the HSTs.

A third option is to provide either of the HSTs outside the housing and the other within the housing, whereby the transmission can be constructed easily and cheaply by using a common axle driving apparatus comprising an HST, a differential and axles contained in a housing and using another common HST for the externally provided HST.

These and other objects, features and advantages of the invention will become more apparent in the detailed description and examples which follow.

DETAILED DESCRIPTION OF THE PREFERRED EMBODIMENTS

Figure 1:
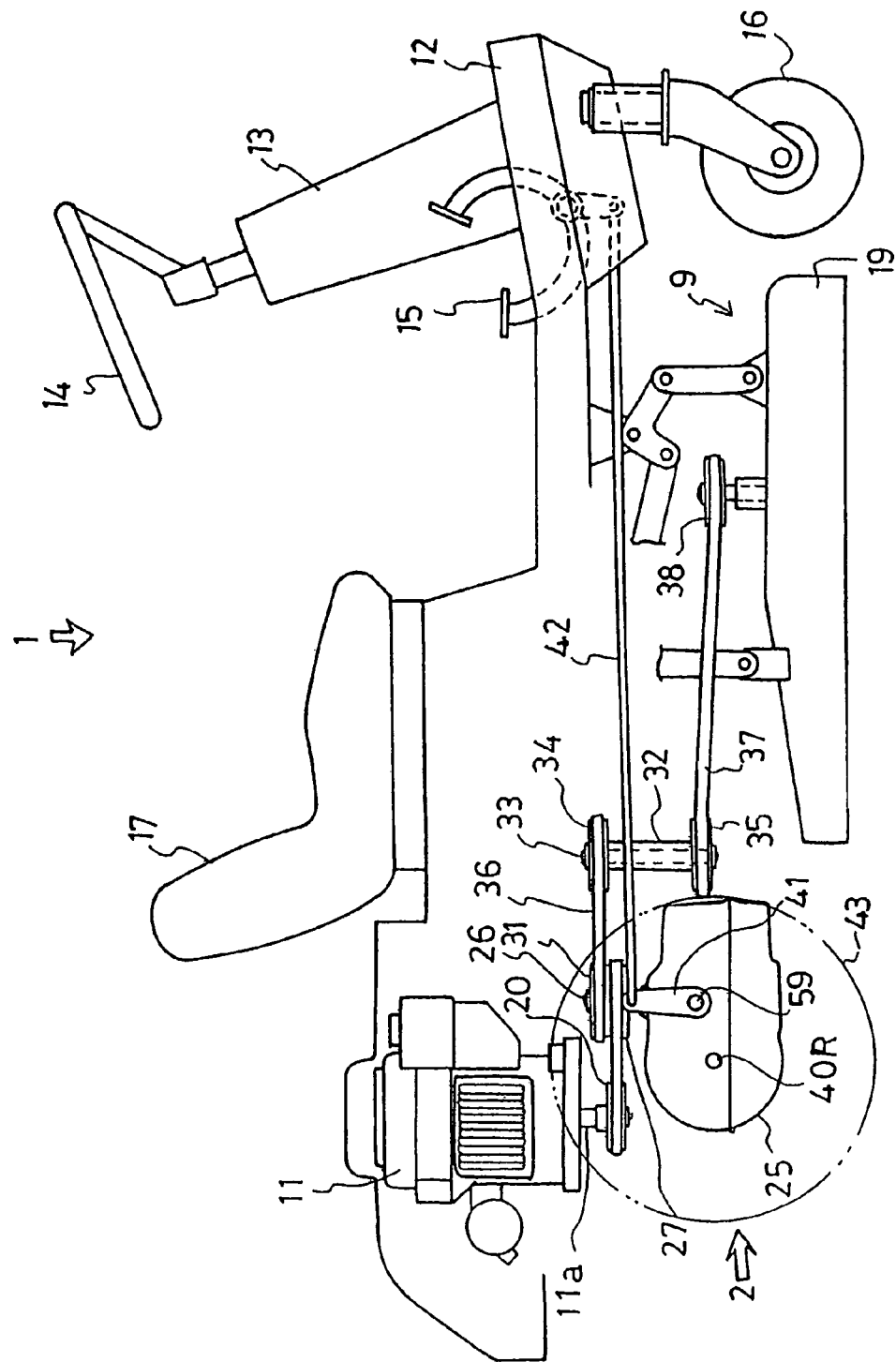
FIG. 1 is a side view showing a mower tractor as a whole provided with a transmission for steering and speed changing in accordance with the present invention.

At first, a general explanation will be given on a construction of a mower tractor 1 provided with a transmission 2 of the present invention in accordance with FIG. 1.

A front column 13 is provided upright on a front portion of a vehicle chassis 12. A steering wheel 14 as a steering operating tool projects upwardly from column 13. A speed change pedal 15 as a speed changing operating tool and brake pedals (not shown) are disposed beside column 13. One or more caster wheels as follower front wheels 16 are disposed on the front lower portion of chassis 12.

A seat 17 is mounted on a center portion of chassis 12. A mower 9 is disposed below chassis 12. Mower 9 comprises a casing 19 with at least one rotary blade provided therein, which is driven by power of an engine 11 through pulleys, belts and the like. Mower 9 is suspended at front and rear portions of its casing 19 by linkages and is vertically moveable.

Engine 11 is mounted on a rear portion of chassis 12 and is covered with a bonnet. Engine 11 has a vertically axial crankshaft provided with a vertically downward projecting output shaft 11a. An output pulley 20 is fixed onto a lower end of output shaft 11a.

Figure 2:
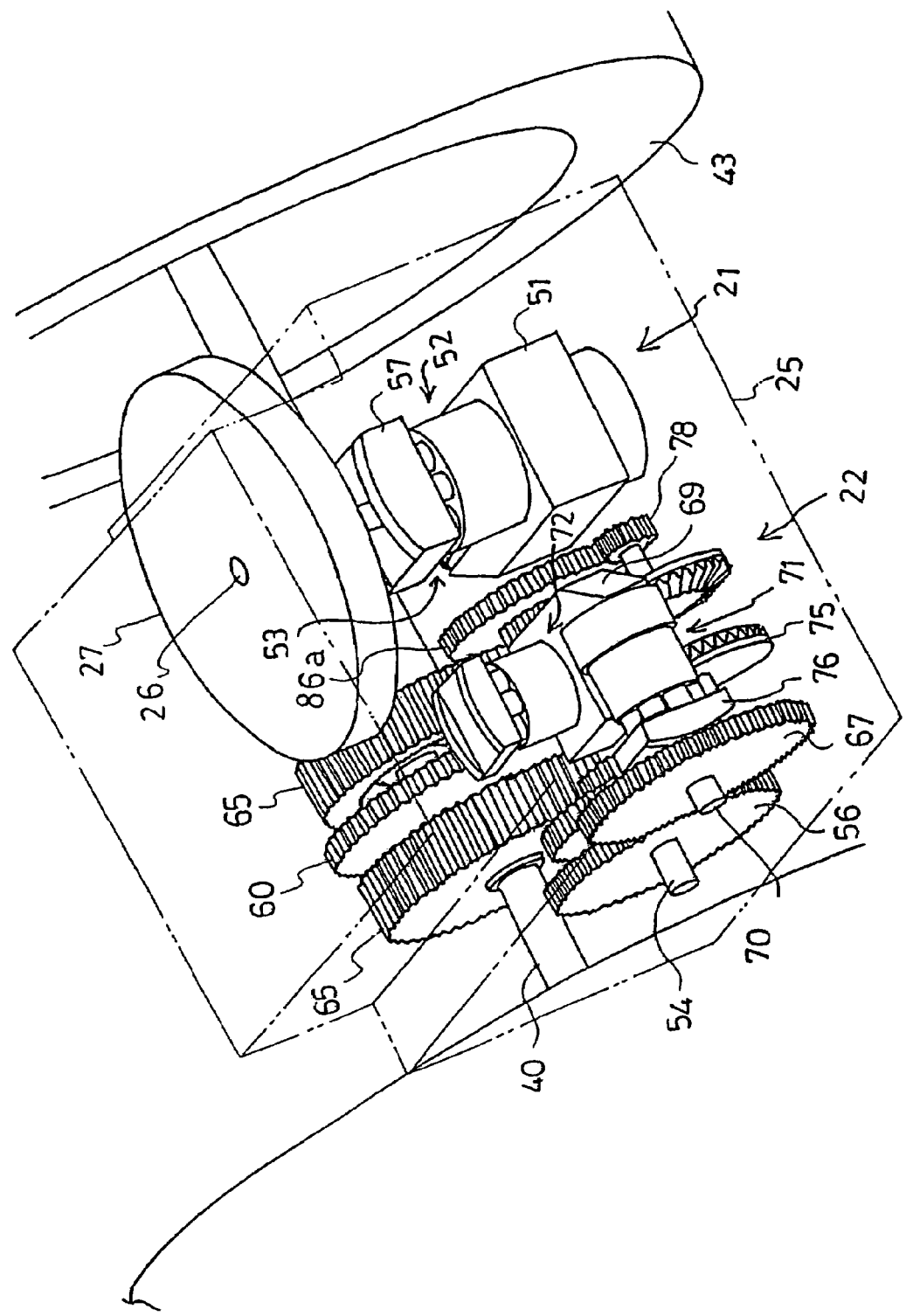
FIG. 2 is a perspective view of the transmission in accordance with a first embodiment of the present invention, provided on the mower tractor when a housing is removed.
Figure 3:
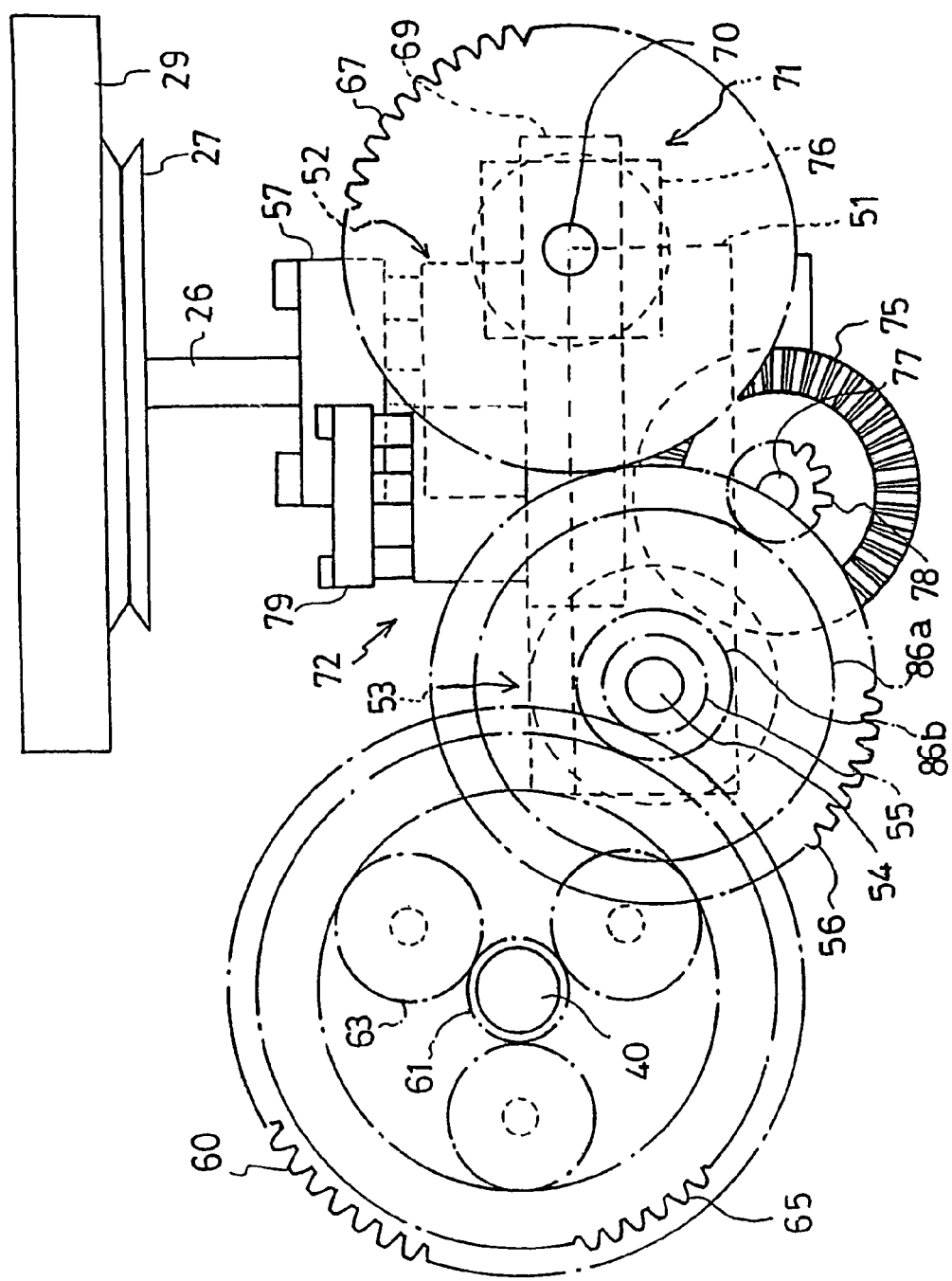
FIG. 3 is a side view of the same transmission.
Figure 4:
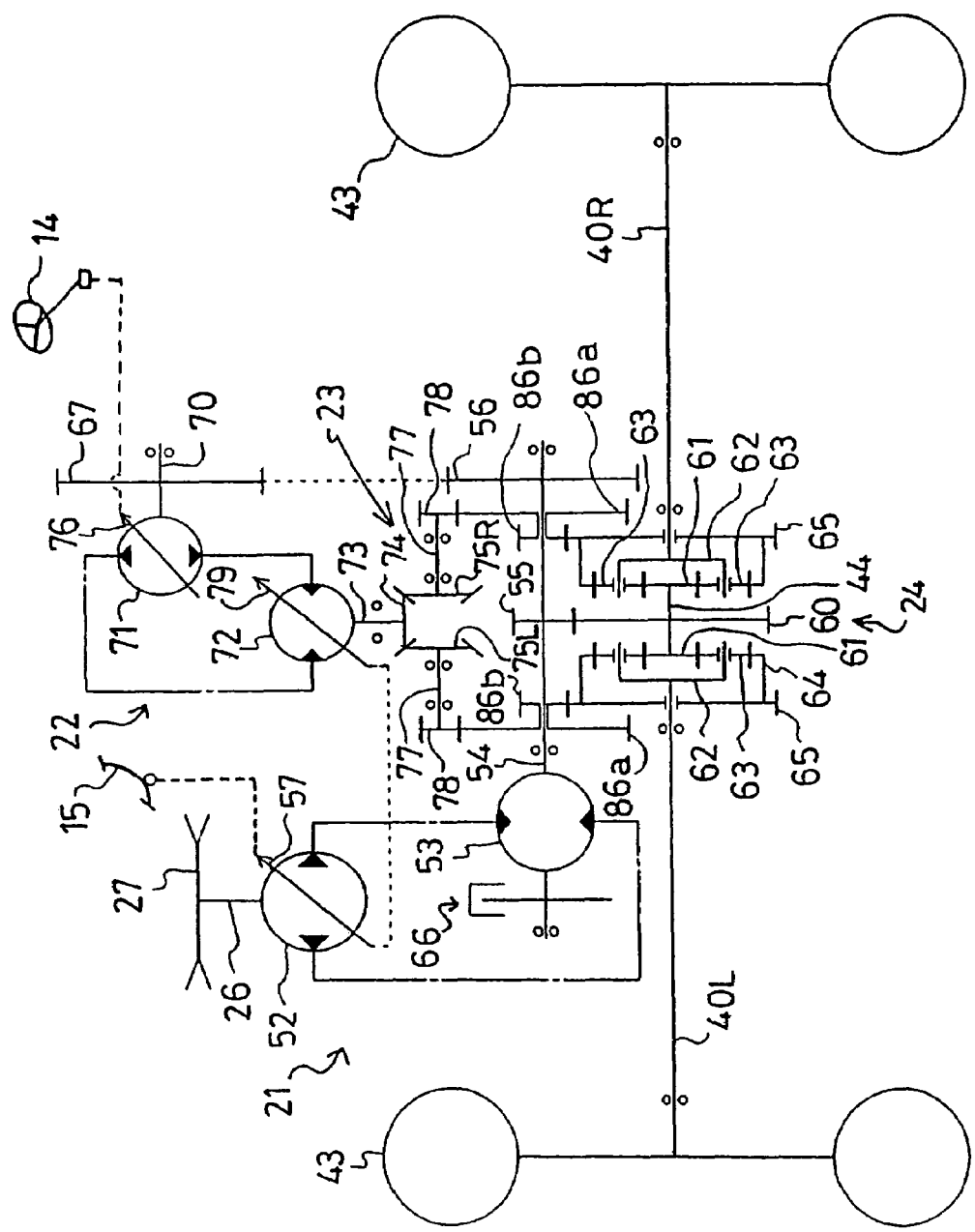
FIG. 4 is a diagram of a power transmitting system of the same transmission.

Transmission 2 of the present invention is disposed on the lower rear portion of chassis 12. As shown in FIGS. 2, 3 and 4, a housing 25 contains therein transmission 2, which comprises a first HST 21 for speed changing in advancing and reversing, a second HST 22 for steering, a first differential 24 for speed changing in traveling and a second differential 23 for steering. Housing 25 is fixed to chassis 12. Each of HSTs 21 and 22 is an assembly of a hydraulic pump and a hydraulic motor fluidly connected with each other.

An input shaft 26 projects outward from a substantial center of an upper surface of housing 25, so as to be fixedly provided thereon with an input pulley 27 and a cooling fan 29. A belt is interposed between input pulley 27 and output pulley 20 of engine 11 and a tension pulley (not shown) is pressed against the belt, thereby transmitting the power of engine 11 from pulley 20 to the pulley 27.

A pulley 31 is also fixed onto input shaft 26. At a longitudinally intermediate portion of chassis 12 is erected a support boss 32. A counter shaft 33 passes through boss 32 and is fixedly provided on the upper and lower ends thereof with pulleys 34 and 35, respectively, for driving mower 9. A belt 36 is interposed between pulleys 34 and 31, and a belt 37 is interposed between pulley 35 and a pulley 38 fixed onto an input shaft of mower 9. A tension pulley as a belt tension clutch may be also disposed between pulleys 35 and 38, so as to switch on and off mower 9.

Next, referring to FIGS. 2,3 and 4, the internal mechanism of housing 25 as transmission 2 comprising HSTs 21 and 22 and differentials 24 and 23 will be described in accordance with a first embodiment of the present invention.

First HST 21 for speed change in traveling is a well-known combination of a variable capacity type hydraulic pump 52 and a fixed capacity type hydraulic motor 53. A pump shaft of hydraulic pump 52 constitutes input shaft 26 vertically supported in housing 25. Hydraulic pump 52 is fitted onto a horizontal portion of a center section 51 fixed to the interior of housing 25. Hydraulic motor 53 is fitted to a vertical portion of center section 51 behind the horizontal portion thereof. A motor shaft 54 of hydraulic motor 53 is laterally axially disposed. Hydraulic pump 52 and hydraulic motor 53 are fluidly connected with each other through a closed circuit in center section 51.

Hydraulic pump 52 is provided with a movable swash plate 57 as an output speed changing means of first HST 21 or as a capacity changing means of hydraulic pump 52, thereby changing the discharge direction and volume of pressure oil from hydraulic pump 52. A control shaft 59 is connected to the swash plate 57. A neutral biasing spring is wound around control shaft 59 in housing 25, thereby biasing shaft 59 toward its neutral position. The neutral position thereof is movable and adjustable. As shown in FIG. 1, control shaft 59 is connected to a speed changing operating tool like a lever or a pedal (in this embodiment, a speed change pedal 15) through an arm 41, a link 42 and the like. Pedal 15 is pivoted at its center, thereby looking like a seesaw.

Hydraulic motor 53 is rotated in one direction for advancing of a vehicle by treading on a front portion of pedal 15 and is rotated in the opposite direction for reversing of the vehicle by treading on a rear portion thereof. Whichever portion is trod, the rotary speed of hydraulic motor 53 is increased in proportion to the depth pedal 15 is trod. As a result, swash plate 57 is slantingly operated by treading on pedal 15, so that the pressure oil discharged from hydraulic pump 52 is adjusted in direction and volume and is supplied into hydraulic motor 53 through the closed circuit within center section 51.

Speed change pedal 15 may also be divided into two pedals for advancing and reversing. Anyway, the construction of the speed changing operating tool is not restricted to such a pedal 15.

A traveling drive gear 55 and a steering drive gear 54 are fixedly provided onto one side of motor shaft 54 and a brake 66 is provided onto the other side of motor shaft 54. Brake 66 is applied by operation of the above said brake pedal or the like, thereby braking axles to a stop. Its position is not limited to the position described above. It can be disposed on any rotary member in the traveling drive system between input shaft 26 of first HST 21 and the axles.

Regarding first differential 24, a shaft 44 is disposed between a pair of first differential output shafts 40 (left and right first differential output shafts 40L and 40R). Shafts 40 constitute left and right axles in this embodiment. Shaft 44 is disposed so as to have the same axis with shafts 40. A center gear 60 is fixed onto shaft 44 so as to engage with drive gear 55. A pair of sun gears 61 are fixed respectively onto both end portions of shaft 44 with center gear 60 between them. A pair of carriers 62 are fixed respectively onto inner sides of shafts 40. A plurality of planet gears 63 are pivoted on each carrier 62 so as to engage with the periphery of each sun gear 61. A pair of large diametric gears 65 (left and right large diametric gears 65L and 65R) centering sun gears 61 are disposed at both sides of center gear 60. Each gear 65 integrally forms a ring gear 64 on its inner periphery. Each ring gear 64 peripherally engages with every planet gear 63 surrounding each sun gear 61. In this way, there are constructed a pair of planetary gears connected to shafts 40.

With respect to a vehicle employing the conventional lateral arrangement of a pair of HSTs, left and right driving axles are individually driven by the pair of HSTs, whereby the both outputs of the HSTs are necessarily equalized exactly for straight traveling. A vehicle employing the transmission of the present invention, on the other hand, has differential output shafts 40L and 40R differentially connected with each other through first differential 24 as left and right axles, thereby requiring no equalization of output between two HSTs.

In second HST 22 for steering, an input gear 67 fixed onto an input shaft 70 as a pump shaft of a hydraulic pump 71 engages with the steering drive gear 56. The shaft 70 is laterally axially disposed in parallel to shafts 40. Both hydraulic pump 71 and a hydraulic motor 72 of HST 22 are variable capacity types. They are fluidly connected with each other through a closed circuit within a center section 69. Hydraulic pump 71 is provided with a movable swash plate 76 as an output speed changing member of HST 22 or as a capacity changing means of hydraulic pump 71. It is connected with steering wheel 14 through a linkage or the like, so as to be rotated in correspondence to rotating operation of steering wheel 14.

Figure 6:
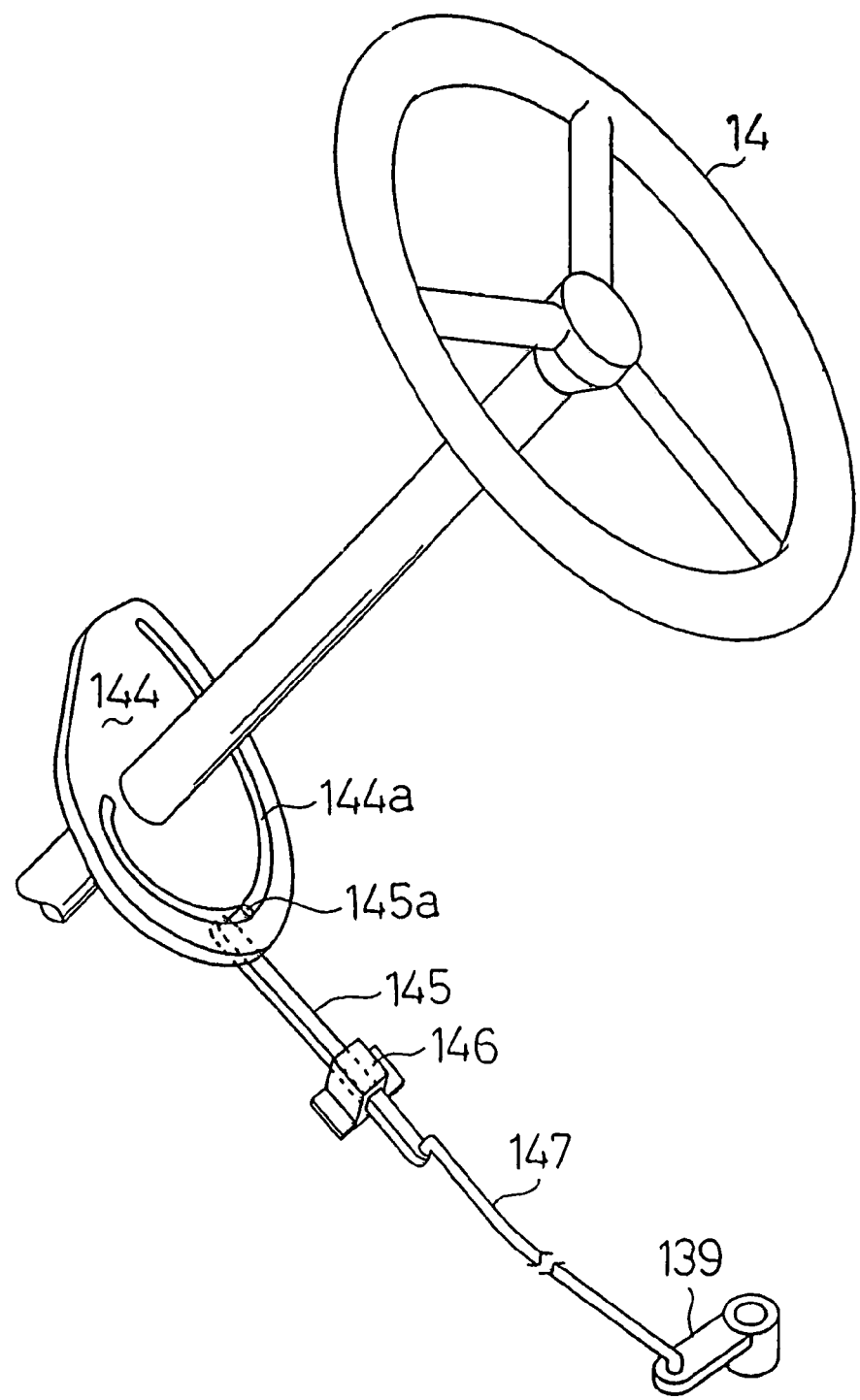
FIG. 6 is a perspective view of a linkage interposed between a steering wheel and a control arm connected to a movable swash plate of a hydraulic pump for steering.
Figure 7:
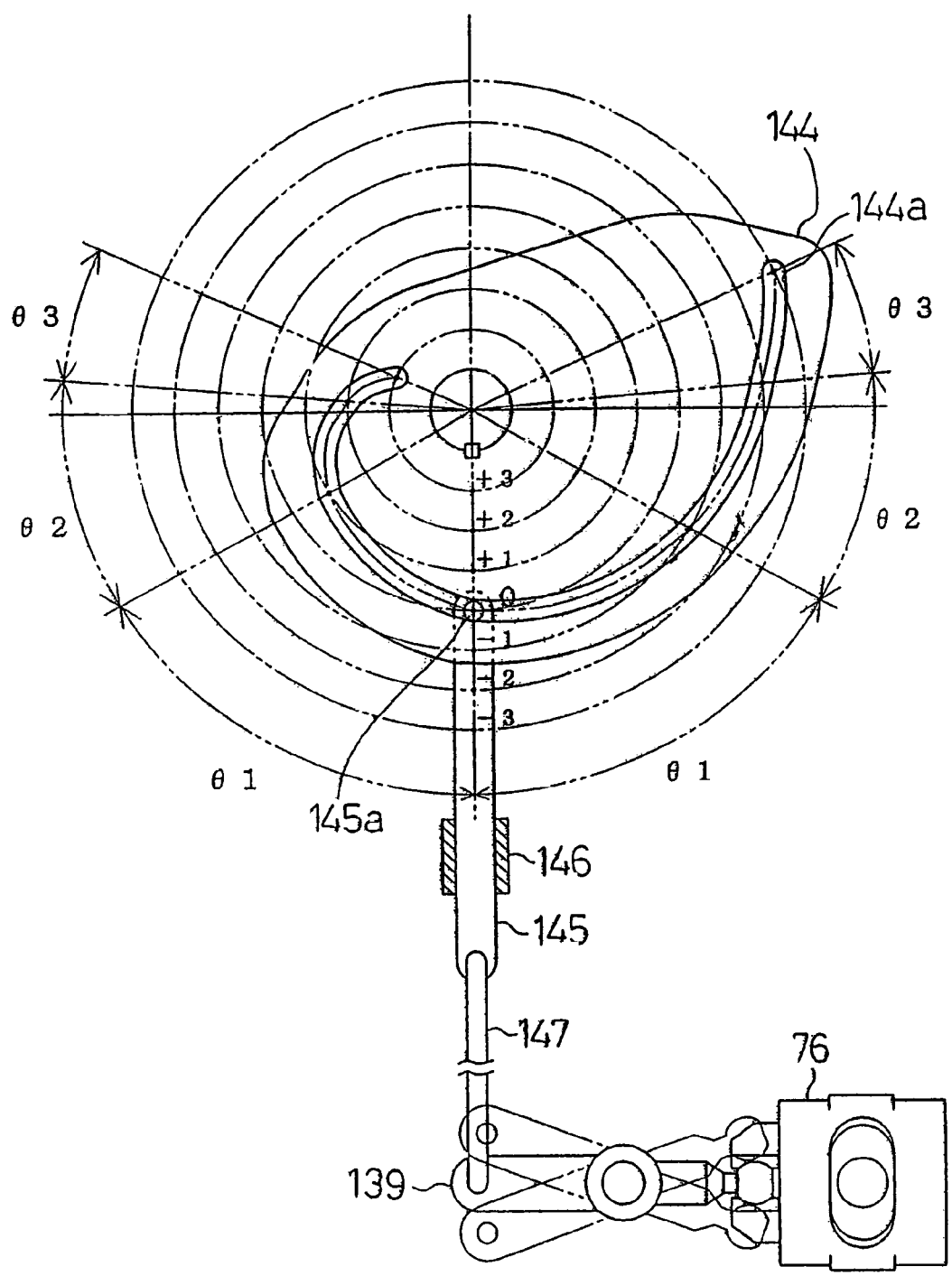
FIG. 7 is a plan view of the same.

Referring now to FIGS. 6 and 7, there is shown one embodiment of a linkage between steering wheel 14 and swash plate 76. This is so constructed as to reduce the sensitivity of replication of swash plate 76 to the steering operation when steering wheel 14 is in vicinity of its straight traveling position, thereby providing a more stable operation of the vehicle when steering wheel 14 is slightly rotated for turning.

A cam plate 144 centering a stem 14a of steering wheel 14 is provided with a cam groove 144a. Cam groove 144a is curved such that one end thereof is close to stem 14a and the other is far from it. A cam follower 145a stuck to a slide link 145 is movably inserted into the groove 144a. The link 145 passes slidably through a slide guide 146, thereby being slidable in a direction approximately coinciding with a rotational range of a control arm 139, which is integrally extended from swash plate 76. A connecting rod 147 is interposed between link 145 and arm 139, so as to be rotatable according to rotation of arm 139.

Figure 8:
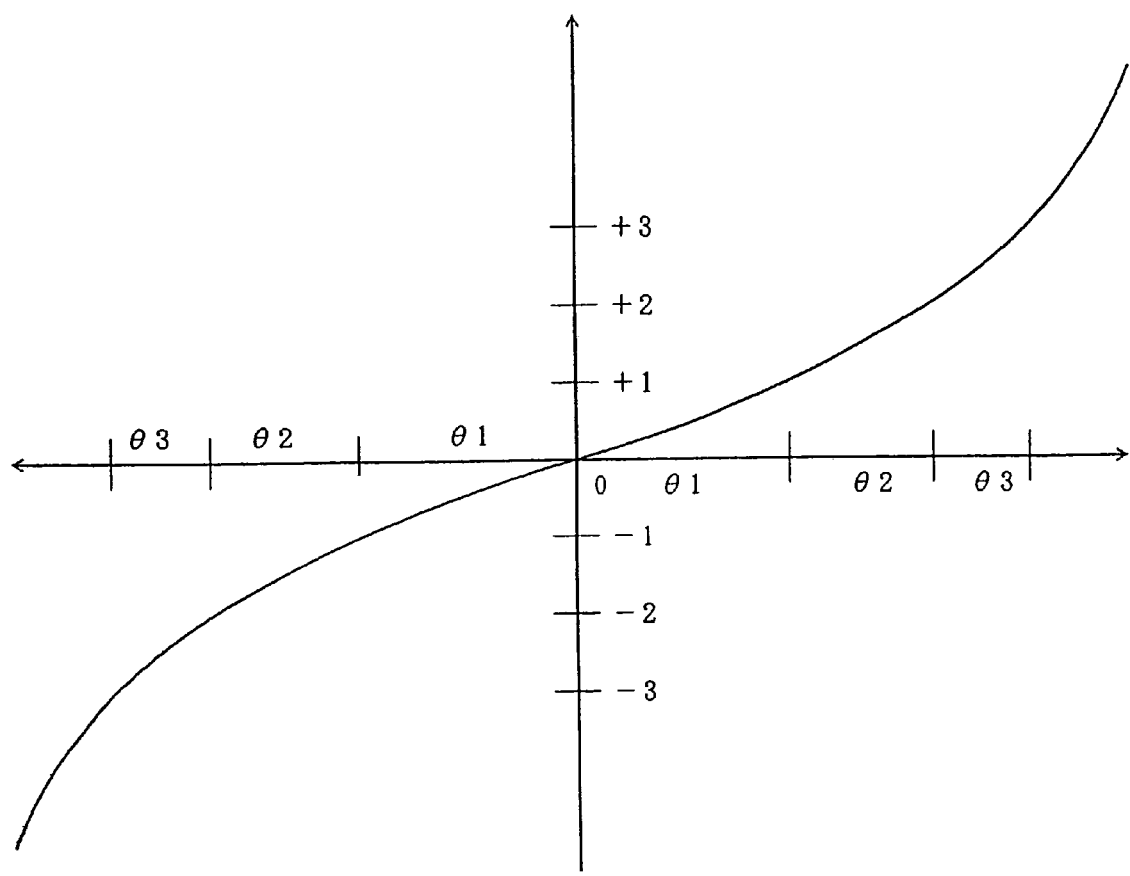
FIG. 8 is a graph showing the relationship between a position of a slide link and a steering angle of the steering wheel in the same linkage.

In this construction, cam groove 144a is so designed in shape that link 145 slides at a small rate to a unit rotational angle of steering wheel 14 when steering wheel 14 (cam plate 144) is in vicinity of its straight traveling position. As shown in FIG. 7, the straight traveling position of cam follower 145a is designated as 0. The position of cam follower 145a moves from 0 to +3 through +1 and +2 in proportion to the leftward rotational angle of steering wheel 14. Also, it moves from 0 to −3 through −1 and −2 in proportion to the rightward rotational angle of steering wheel 14. As shown in FIGS. 7 and 8, while cam follower 145a is moved between 0 and +1 or between 0 and −1 the increase of the leftward or rightward rotational angle of steering wheel 14 is θ1. It is larger than the rotational angle of θ2 in case of cam follower 145a moving between +1 and +2 or between −1 and −2, and that of θ3 in case of moving between +2 and +3 or between −2 and −3 (θ1>θ2, θ3).

Accordingly, when steering wheel 14 is rotated in its rotational range of left or right turning spaced from the straight traveling position, link 145 slides at a large rate in relation to the rotation thereof, thereby moving the swash plate 76 sensitively. On the other hand, when steering wheel 14 is rotated in vicinity of its straight traveling position, link 145 and swash plate 70 are moved gradually. In other words, swash plate 76 scarcely moves if steering wheel 14 is rotated a little from its straight position, thereby enabling the straight traveling course of the vehicle to remain stable.

Now regarding second HST 22 for steering, a motor shaft 73 of hydraulic motor 72 is vertically supported so as to project downward from center section 69. A bevel gear 74 is fixed onto the lower end of shaft 73. A pair of side gears 75 (left and right side gears 75L and 75R) engage respectively with both sides of gear 74 for the purpose of forming two power transmitting courses. Accordingly, pair of side gears 75 tend to rotate in opposite directions with respect to each other by rotation of shaft 73. Each gear 75 is fixed onto each of a pair of second differential output shafts 77 (left and right second differential output shafts 77L and 77R). A pair of small diametric gears 78 are fixed onto outer ends of shafts 77. A pair of double gears 86, each of which consists of a large diametric gear 86a and a small diametric gear 86b, are rotatably provided on shaft 54. Gear 86a engages with small diametric gear 78 and gear 86b engages with large diametric gear 65.

Figure 9:
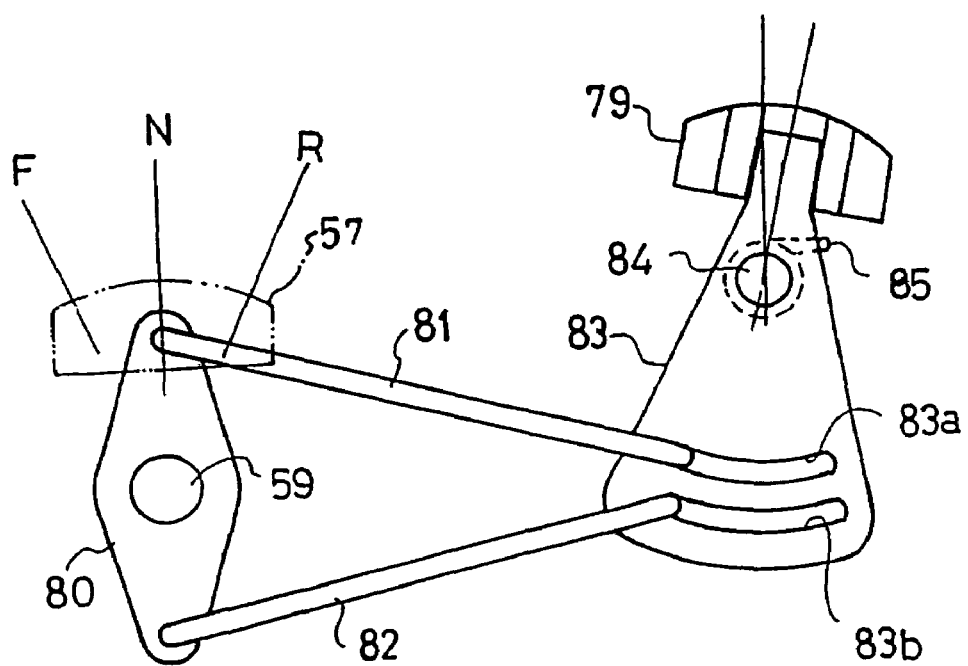
FIG. 9 is a schematic view of a linkage interposed between movable swash plates of a hydraulic pump for speed changing and of a hydraulic motor for steering.

In the aforementioned transmission 2 of the first embodiment as shown in FIGS. 2, 3 and 4, a movable swash plate 79 of motor 72 of second HST 22 is connected with swash plate 57 of hydraulic pump 52 of first HST 21 through a linkage for the purpose of corresponding the turning radius of the vehicle to the traveling speed. This linkage is best shown in FIG. 9. In this regard, a rhomb control arm 80 is fixed at its center onto control shaft 59. Control links 81 and 82 are pivoted at their one ends onto side ends of control arm 80. The other ends of control links 81 and 82 are movably anchored to a fan-shaped control plate 83 for rotation of swash plate 79.

In this regard, control plate 83 is fitted at a projection on an apex thereof to the plate 79 and is fixed at the center thereof onto control shaft 84. It is provided at the portion near the arcuate edge thereof with a pair of arcuate holes 83a and 83b. The above said other ends of links 81 and 82 are slidably inserted respectively into holes 83a and 83b. A coiling spring 85 is wound around shaft 84 with one end thereof fitted to plate 83, whereby the swash plate 79 is biased toward its neutral position or the slanting angle thereof tends to a minimum.

Explanation will be now given to the operation of transmission 2, including the linkage shown in FIG. 9, according to a first embodiment of the present invention.

While engine 11 is on, input shaft 26 always rotates. When steering wheel 14 is set to its straight traveling position, second HST 22 is neutral. In this state, swash plate 57 of hydraulic pump 52 of first HST 21 rotates in accordance with treading on pedal 15 forward or rearward, thereby driving hydraulic motor 53 of first HST 21. The rotational power of motor 53 is transmitted into first differential output shafts 40 as axles through traveling drive gear 55, center gear 60 and first differential 24, thereby enabling the vehicle to advance or reverse in a straight line.

During such advancing or reversing, power is transmitted from motor shaft 54 into input shaft 70 of second HST 22 through gears 56 and 67, whereby hydraulic pump 71 of second HST 22 is driven. The volume per minute of pressure oil discharged from hydraulic pump 71 is increased in proportion to the rotational speed of shaft 54, that is, the traveling speed of the vehicle. Accordingly, if the advancing or reversing vehicle turns by operation of steering wheel 14, the replication of turning thereof is more sensitive in proportion to the traveling speed, whereby an operator can obtain a good feeling of steering.

If steering wheel 14 is operated for turning while pedal 15 is trod for advancing, swash plate 76 of hydraulic pump 71 is rotated so as to drive hydraulic motor 72. When steering wheel 14 is in right turning operation, or is rotated rightward, motor shaft 73 of hydraulic motor 72 is regularly rotated, thereby rotating left side gear 75L regularly and right side gear 75R reversely through bevel gear 74. The regular rotation of gear 75L accelerates left large diametric gear 65L of the left planetary gear, which rotates together with left differential output shaft 40L in advancing rotation through planet gears 63. The reverse rotation of gear 75R decelerates the right planetary gear regularly rotating together with right differential output shaft 40R. Thus, the vehicle turns right.

When steering wheel 14 is in left turning operation, swash plate 76 is rotated to the opposite side, thereby rotating shaft 73 reversely. Thus, gear 75L is reversely rotated and gear 75R is regularly rotated, so that the rotation of shaft 40L is decelerated and that of 40R is accelerated, whereby the vehicle turns left.

When steering wheel 14 is in right turning operation while pedal 15 is trod for reversing, swash plate 57 is in its reversing range, whereby shaft 54 is rotated in reverse direction so as to rotate the shafts 40L and 40R reversely. Also, input shaft 70 is reversely rotated, whereby gear 75L is reversely rotated and gear 75R is regularly rotated. Thus, the reverse rotation of the left planetary gear are accelerated together with shaft 40L and the regular rotation of the right planetary gear are decelerated together with shaft 40R, whereby the vehicle turns right.

On the other hand, when steering wheel 14 is in left turning operation while pedal 15 is trod for reversing, gear 75R is reversely rotated, so that the right planetary gear together with shaft 40R is accelerated, whereby the vehicle turns left.

Thus, the reversing vehicle can also turn to a side in coincidence with a rotational direction of steering wheel 14, so that it can be steered as easily as a passenger car.

When pedal 15 is neutral, hydraulic motor 53 for speed changing is not driven, so that hydraulic pump 71 for steering is not driven. Accordingly, even if the steering wheel 14 is rotated for turning, hydraulic motor 72 is still off, whereby first differential output shafts 40 are not accelerated or decelerated. The vehicle is thus prevented from moving, even if an operator on the stopped vehicle touches steering wheel 14.

By means of the above mentioned linkage shown in FIG. 9, motor 72 for steering is decelerated in inverse proportion to the depth of tread on pedal 15. Thus, the vehicle turns along a large turning radius when traveling fast, and it turns along a small one when traveling slowly, for easy and safe steering.

Figure 10:
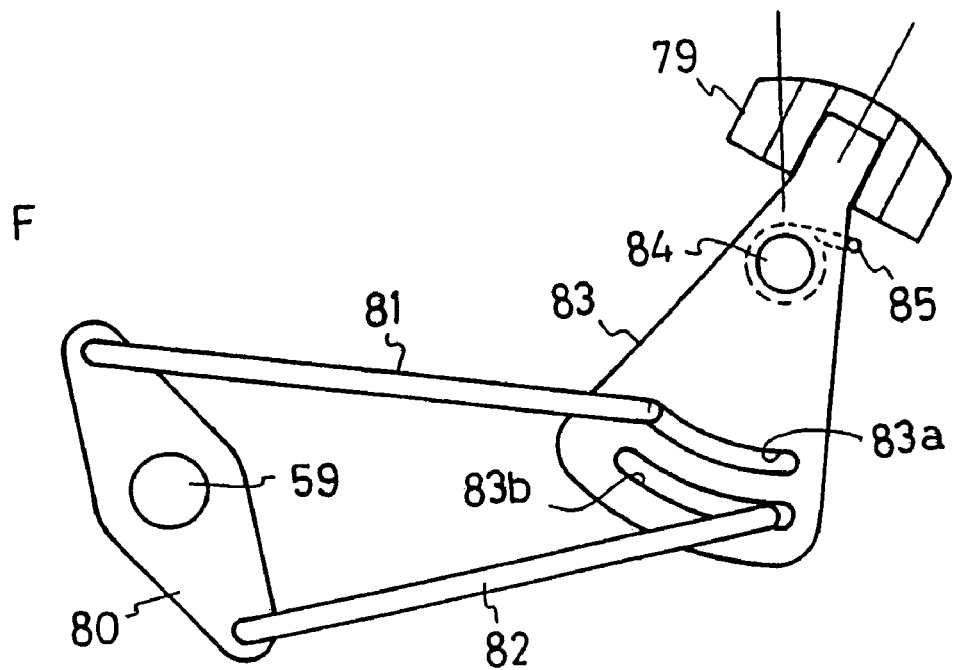
FIG. 10 is a schematic view of the same in advancing.

Explanation will be now given to the operation of this linkage. As shown in FIG. 10, when pedal 15 is trod forward for advancing, swash plate 57 is rotated so as to drive motor 53 in accordance with the rotation of control shaft 59. Simultaneously, control arm 80 rotates so as to pull control link 81. When trod pedal 15 reaches the predetermined depth, the end of link 81, which is movably inserted into arcuate hole 83*a*, comes to abut against an end of hole 83*a* of control plate 83. If pedal 15 is trod more deeply, link 81 pulls the arcuate edge of plate 83 so as to rotate it, whereby swash plate 79 is rotated so as to increase its slanting angle in proportion to the depth of trod pedal 15.

The strokes of pistons of hydraulic motor 72 are longer in proportion to the slanting angle of its swash plate 79. When pedal 15 is trod slightly, swash plate 79 is slanted slightly, thereby shortening the strokes of the pistons. If the depth of trod pedal 15 is less than the predetermined degree, the end of control link 81 is freely slidable in arcuate hole 83*a*, so that plate 83 stays, swash plate 79 is slant at the smallest angle and the strokes of the pistons of motor 72 are kept to a minimum.

Thus, when steering wheel 14 is rotated for turning to some degree so as to make hydraulic pump 71 discharge pressure oil into motor 72, the rotary speed of motor shaft 73 is reduced in inverse proportion to the depth of trod pedal 15. If motor shaft 73 is rotated slowly, the rotations of gears of second differential 23 for accelerating and decelerating the shafts 40 are also slow, so that the turning radius of the vehicle becomes large. As a result, when traveling fast, the vehicle can turn along a large turning radius, thereby improving safety by preventing sudden turning. On the other hand, when traveling slowly, the same steering angle turns the vehicle along a small turning radius, thereby enabling the vehicle to turn around swiftly and easily.

Figure 11:
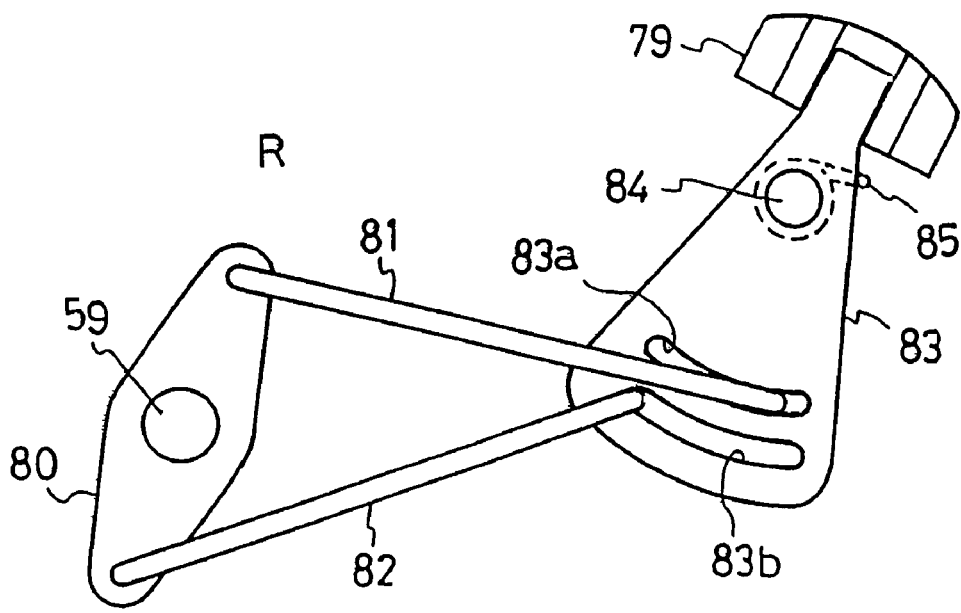
FIG. 11 is a schematic view of the same in reversing.

As shown in FIG. 11, when pedal 15 is trod rearward for reversing, arm 80 together with shaft 59 rotate in the direction opposite to that described above. In this case, arm 80 pulls control link 82. An end of link 82 abuts against an end of arcuate hole 83*b* when trod pedal 15 reaches the predetermined depth. If pedal 15 is trod more deeply, link 82 pulls plate 83 and rotates it, so that the slanting angle of swash plate 79 is increased in proportion to the depth of trod pedal 15, whereby the rotary speed of motor shaft 53 is reduced in inverse proportion to the same. Thus, similar to the above described operation when advancing, when utilizing the same steering angle, the vehicle turns along a large turning radius when traveling fast and turns along a small turning radius when traveling slowly.

Figure 12:
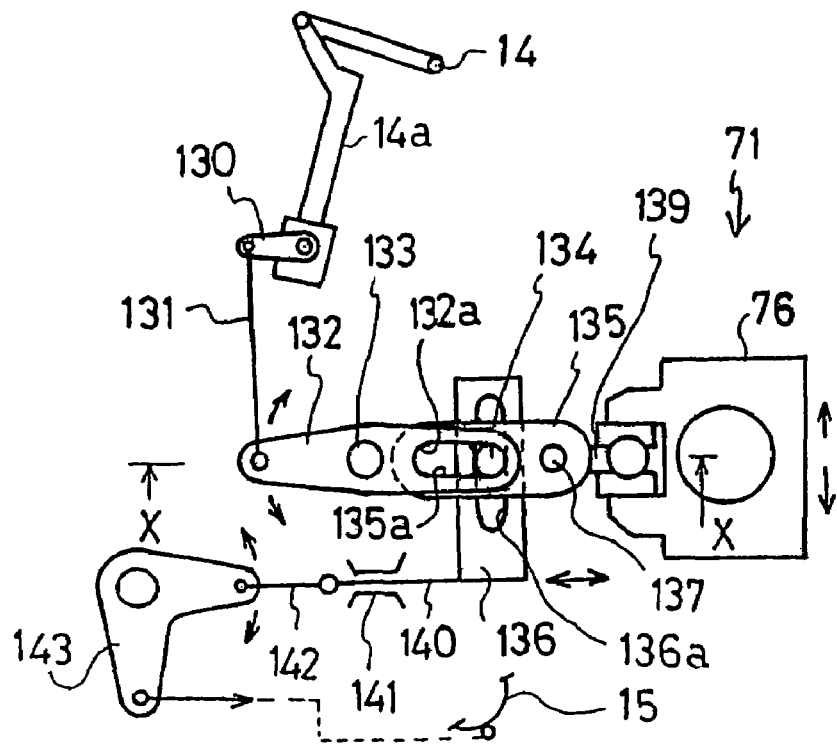
FIG. 12 is a view of a linkage having a bendable point interposed between the steering wheel and the movable swash plate of the hydraulic pump for steering, wherein the bendable point is moved according to motion of another linkage connected to the speed change pedal.
Figure 13:
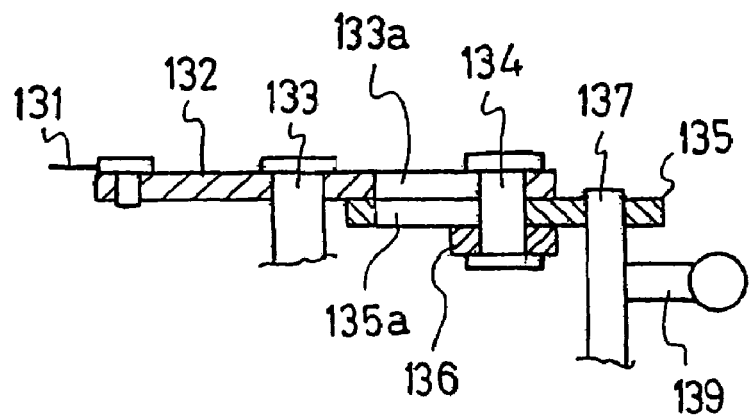
FIG. 13 is a sectional view looking in the direction of the arrows X-X in FIG. 12.

A second embodiment for obtaining the similar relation between the traveling speed and the steering angle is shown in FIGS. 12 and 13. In this embodiment, hydraulic motor 72 for steering is a fixed capacity type, and two links are interposed between steering wheel 14 and swash plate 76 of hydraulic pump 71, wherein a ratio of one link to the other is changeable in length corresponding to the depth of trod pedal 15.

The base of stem 14*a* integral with steering wheel 14 interlocks with a Pitman 130. An utmost end of Pitman 130 is pivotally connected with a rotary link 132 through a connecting rod 131. Link 132 is pivoted at its intermediate portion around a pivotal shaft 133. The portion of link 132 opposite to the utmost end of Pitman 130 with respect to shaft 133 is bored by a longitudinally long hole 132*a*. A pivotal pin 134 slidably passes through hole 132*a*.

Pin 134 also slidably passes through a long hole 135*a* longitudinally bored in a portion of a control link 135 close to its one end. The other end of link 135 is fixed onto a control shaft 137 rotatably supported by housing 25. Control arm 139 projects from shaft 137 and engages with one end of swash plate 76.

Thus, a first linkage consisting of links 132 and 135 has shaft 133 as a first fixed pivotal point, pin 134 as an intermediate movable pivotal point and shaft 137 as a second fixed pivotal point; The first linkage is bendable at the movable pivotal point thereof in accordance with the steering operation of steering wheel 14.

Pin 134 still also slidably passes through a long hole 136*a* bored in a ratio changing link 136. Link 136 is fixed at its one end onto a slide rod 140 axially slidably supported by a guide 141, so that link 136 does not rotate around pin 134 but slides according to motion of pin 134 within hole 136a. An utmost end of rod 140 is pivotally connected to one end of a bell crank 143 through a connecting rod 142. Bell crank 143 is connected at its to pedal 15 through a link or the like. Thus, a second linkage comprising link 136 is extended from pedal 15 to the movable pivotal point as pin 134.

Accordingly, when steering wheel 14 is rotated for turning, Pitman 130 is rotated so as to rotate link 132 around shaft 133 through rod 131, whereby link 135 is rotated, through pin 134. Accordingly, arm 139 is rotated around shaft 137, so that swash plate 76 is slanted, thereby adjusting the discharge volume of hydraulic pump 71 similar to the above described first embodiment.

In this state, when pedal 15 is trod, hydraulic motor 53 of first HST 21 is driven so as to drive shafts 40. Simultaneously, pedal 15 pushes or pulls one end of bell crank 143 so as to rotate it. The rotation of bell crank 143, which is connected at the other end thereof with rod 142 as described above, moves link 139 toward shaft 133 through rod 140. Accordingly, a ratio of a distance between shaft 133 and pin 134 to a distance between pin 134 and shaft 135 (in other words, a ratio of a distance between the first fixed pivotal point and the movable pivotal point to a distance between the movable pivotal point and the second fixed-pivotal point) is reduced in inverse proportion to the depth to which pedal 15 is trod.

When link 132 (steering wheel 14) is rotated to some degree, the rotational angle of arm 139 and the slanting angle of swash plate 76 are reduced in inverse proportion to the depth of trod pedal 15. Thus, at the same steering angle, the discharge volume from hydraulic pump 71 and the rotary speed of hydraulic motor 72 are small when traveling fast and are large when traveling slowly. As a result, the vehicle, which employs transmission 2 comprising hydraulic motor 72 of fixed capacity type together with the linkages shown in FIGS. 12 and 13, has a large turning radius when traveling fast and has a small one when traveling slowly, when steering wheel 14 is at the same steering angle.

The linkage shown in FIGS. 6 and 7 can be additionally adapted to transmission 2 employing the linkage shown in FIGS. 12 and 13. In this case, cam plate 144, link 145, guide 146 and rod 147 are interposed between stem 14a and the utmost end of link 132 instead of link 130 and rod 131. In other words, the above first and second linkages comprising links 132, 135 and 136 shown in FIGS. 12 and 13 are interposed between rod 147 and arm 139 shown in FIG. 6.

Figure 5:
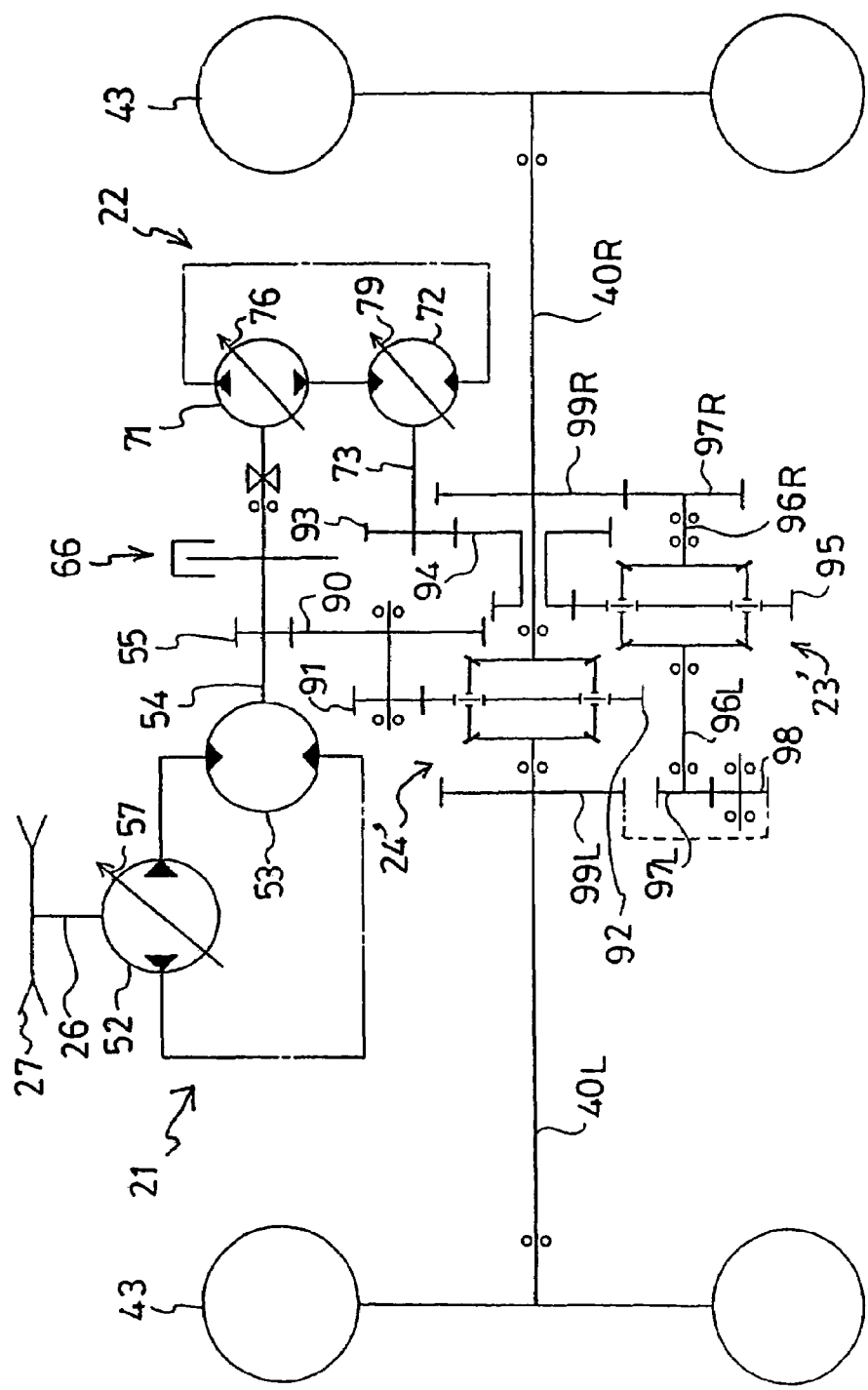
FIG. 5 is a diagram of the same system wherein differentials are modified in accordance with a second embodiment of the present invention.

Referring to FIG. 5, there is shown transmission 2 in accordance with a second embodiment including a first differential 24' and a second differential 23' both comprising differential gear units. In this regard, motor shaft 54 of first HST 21 is directly axially connected with an input shaft of second HST 22. Power of the traveling driver gear 55 fixedly provided on shaft 54 is transmitted into a differential ring gear 92 of differential 24' through gears 90 and 91. A plain gear 93 is fixed onto motor shaft 73 of second HST 22. Power from gear 93 is transmitted into a differential ring gear 95 of differential 23' through a double gear 94. Double gear 94 is relatively rotatably provided on the right first differential output shaft or, as in this embodiment, on second differential 23' for a more compact transmission 2. It may be, however, provided on left shaft 40L. Second differential 23' is provided with a pair of second differential output shafts 96 (left and right second differential output shafts 96L and 96R). Gears 97L and 97R are fixed respectively onto shafts 96L and 96R, and gears 99L and 99R are fixed respectively onto shafts 40L and 40R. Gears 97L and 99L engage with each other through a reversing gear 98, so that they tend in the same rotational direction. Gears 97R and 99R engage with each other directly, so that they rotated in opposite directions. Gear 98 may be also interposed between gears 97R and 99R. In this case, gears 97L and 99L engage with each other directly.

In this construction, when motor shaft 73 is rotated in one direction by turning operation of steering wheel 14 in advancing or reversing, one of shafts 40L and 40R is accelerated and the other is decelerated because of the differential rotations of shafts 96 and the interposition of reversing gear 98, whereby the vehicle turns.

The linkage as shown in FIGS. 6 and 7 can be adapted to transmission 2 of this second embodiment. Transmission 2 can obtain replication of turning in correspondence to the steering angle by adaptation thereof. Also, the linkage shown in FIG. 9 can be adapted to transmission 2 of the same embodiment. Transmission 2 can obtain a changeable turning radius corresponding to the traveling speed by adaptation thereof. Instead of hydraulic motor 72 of variable capacity type and the linkage shown in FIG. 9, transmission 2 of the second embodiment may also employ hydraulic motor 72 of a fixed capacity type and the linkage shown in FIGS. 12 and 13.

FIGS. 14 through 21 show various embodiments of transmissions 2 comprising a pair of HSTs and a pair of differentials. Explanation will be now given to transmissions 2 of the various embodiments.

Figure 14:
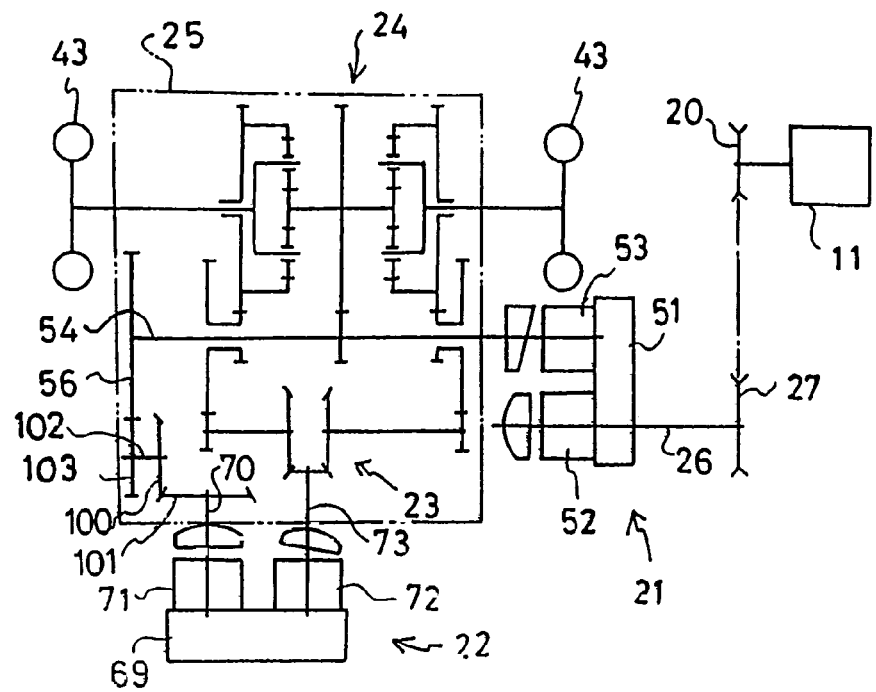
FIG. 14 is a diagram of a power transmitting system of a transmission in accordance with a third embodiment of the present invention.

A third embodiment shown in FIG. 14 is a modified first embodiment. In this regard, each of first HST 21 and second HST 22 is so constructed that its hydraulic pump 52 or 71 and a hydraulic motor 53 or 72 are juxtaposed on its center section 51 or 69. Power from motor shaft 54 of hydraulic motor 53 of first HST 21 is transmitted into shafts 40 through first differential 24 for driving driving wheels 43 (rear wheels) similar to the first embodiment. A transmitting gear 103 and a bevel gear 100 are fixedly provided on a transmitting shaft 102. Steering drive gear 56 fixed on an end of shaft 54 engages with gear 103. A bevel gear 101 is fixed onto input shaft 70 of hydraulic pump 71 of second HST 22 instead of input gear 67 so as to engage with gear 100. Thus, power from shaft 54 is transmitted into shaft 70 through gears 56 and 103 and gears 100 and 101. The transmitting system between second HST 22 and second differential 23 is similar with that of the first embodiment.

In FIG. 14, it will be also noted that first and second differentials 24 and 23 are contained in housing 25 and first and second HSTs 21 and 22 are disposed on an exterior of housing 25.

Figure 15:
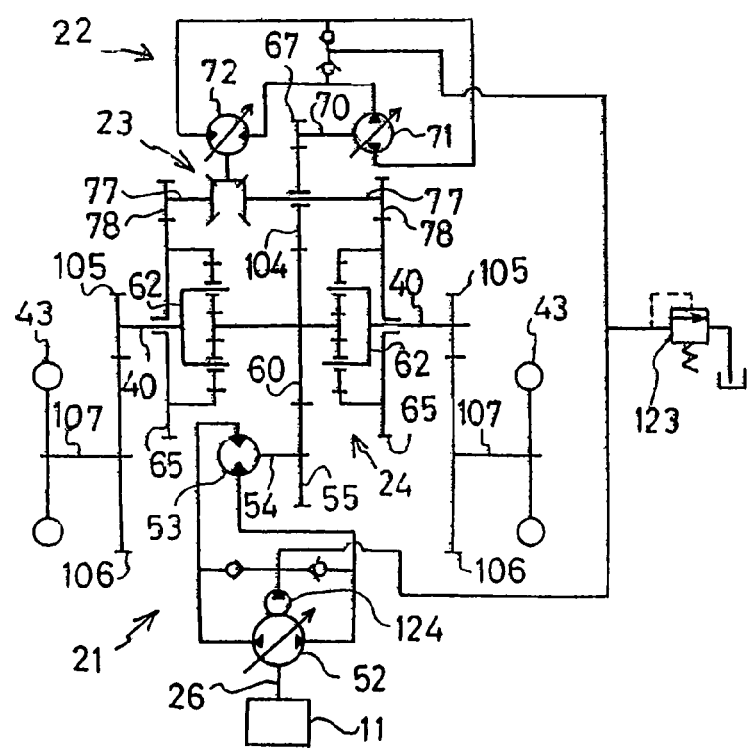
FIG. 15 is a diagram of the same wherein a construction for driving a charge pump is modified.

A fourth embodiment shown in FIG. 15 is also modification of the first embodiment. In this regard, power from motor shaft 54 is transmitted into first differential 24 for driving wheels 43 through gears 55 and 60 similar to the first embodiment and is also transmitted into a transmitting gear 104 relatively rotatably provided on one of shafts 77 of second differential 23 through the same gears 55 and 60.

Each of gears 78 fixed on each of shafts 77 of the fourth embodiment engages directly, whereas that of the first embodiment engages through double gear 86, with each of the gears 65 of first differential 24 involving the pair of planetary gears. Furthermore, wheels 43 of the fourth embodiment are attached respectively to a pair of axles 107, each of which engages with each of shafts 40 through speed reduction gears 105 and 106, whereas each of wheels 43 of the first embodiment is directly attached to its respective shaft 40.

As a result, the axle driving rotary speed is reduced after output from first differential 24 in the fourth embodiment, whereas it is reduced between shafts 77 and gears 65 of first differential 24 in the first embodiment.

Figure 16:
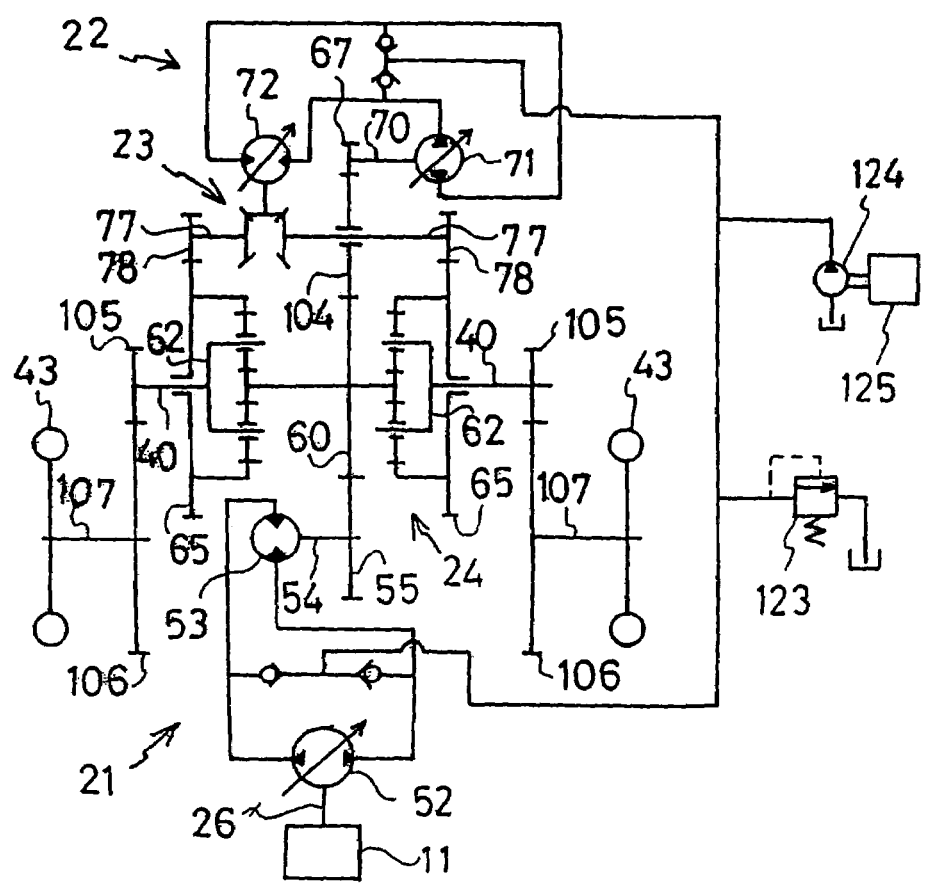
FIG. 16 is a diagram of a power transmitting system of a transmission in accordance with a fourth embodiment of the present invention.

In this embodiment, first and second HSTs 21 and 22 are supplied with pressure oil in common by a charge pump 124 which is driven by engine 11. Reference numeral 123 designates a relief valve for setting a charging pressure of pump 124. Pump 124 may be also driven by an additional electric motor 125, as shown in FIG. 16.

FIGS. 17 through 21 show modifications to the second embodiment, described above with respect to FIG. 5.

Figure 17:
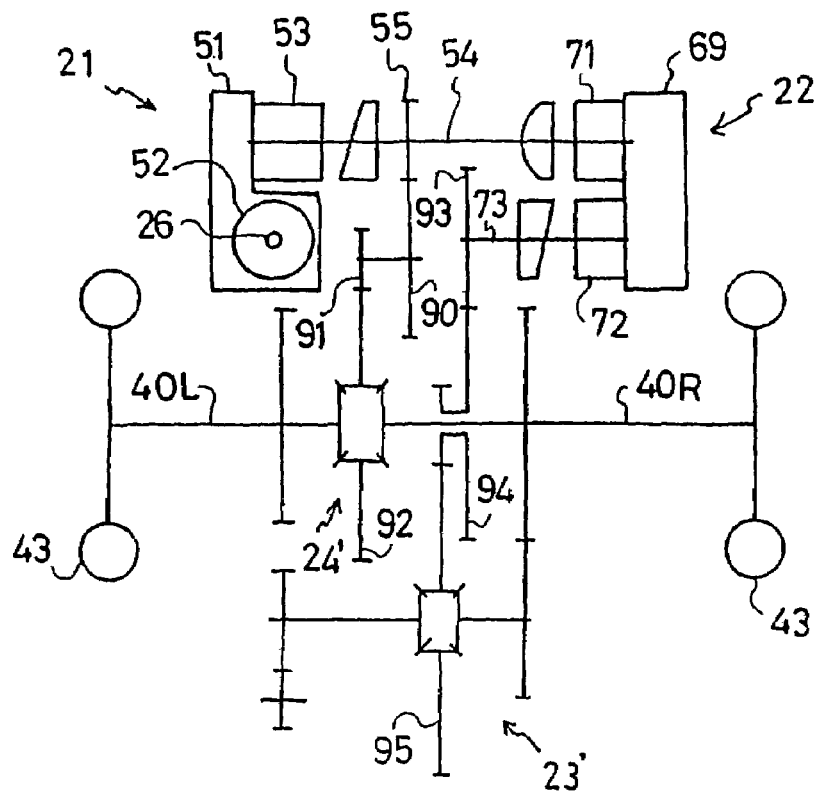
FIG. 17 is a diagram of a power transmitting system of a transmission in accordance with a fifth embodiment of the present invention.

A fifth embodiment shown in FIG. 17 details the disposal of first and second HSTs 21 and 22 of the second embodiment, wherein the oil circuit and the gear train are similar to those of the second embodiment. In this regard, HSTs 21 and 22 are laterally separately disposed with respect to traveling drive gear 55. Center sections 51 and 69 are disposed at utmost outsides of transmission 2, so that hydraulic motor 53 of first HST 21 and hydraulic pump 71 of second HST 22 face each other. Motor shaft 54 is disposed in common or along the same axis with the input shaft of hydraulic pump 71 of second HST. This arrangement allows a more compact transmission 2.

Figure 18:
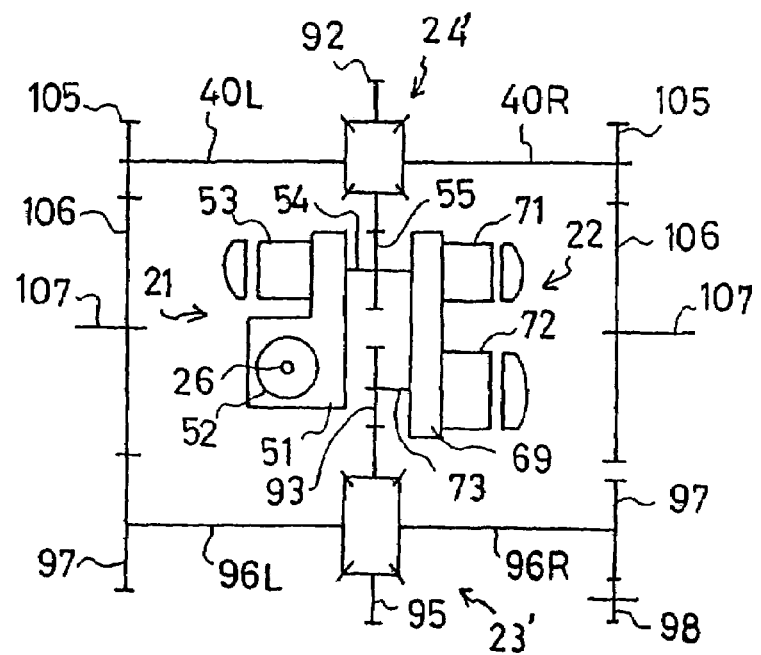
FIG. 18 is a diagram of a power transmitting system of a transmission in accordance with a sixth embodiment of the present invention.

In a sixth embodiment shown in FIG. 18, center sections 51 and 69 face each other. Motor shaft 54, which is in common with the input shaft of hydraulic pump 71 of second HST 22, passes through center section 51. Traveling drive gear 55 fixed on shaft 54 directly engages with differential ring gear 92 of first differential 24'. Small diametric speed reduction gear 105 fixed on the outside portion of each first differential output shaft 40 engages with large diametric speed reduction gear 106 fixed on each axle 107.

Motor shaft 73 of second HST 22 passes through center section 69 so as to project into the space between center sections 51 and 69. Plain gear 93 fixed on shaft 73 directly engages with differential ring gear 95 of second differential 23'. One of gears 97 fixed on second differential output shafts 96, directly engages with gear 106 on one of axles 107 and the other gear 97 engages with gear 106 on the other axle 107 through a reversing gear 98.

Transmission 2 of this embodiment is compact as a whole because the speed reduction mechanism is simplified, gears 55 and 93 are disposed between the center sections 51 and 69 and first and second HSTs 21 and 22 are disposed so as to be surrounded by the pairs of shafts 40 and 96 and the pairs of gears 105 and 106.

Figure 19:
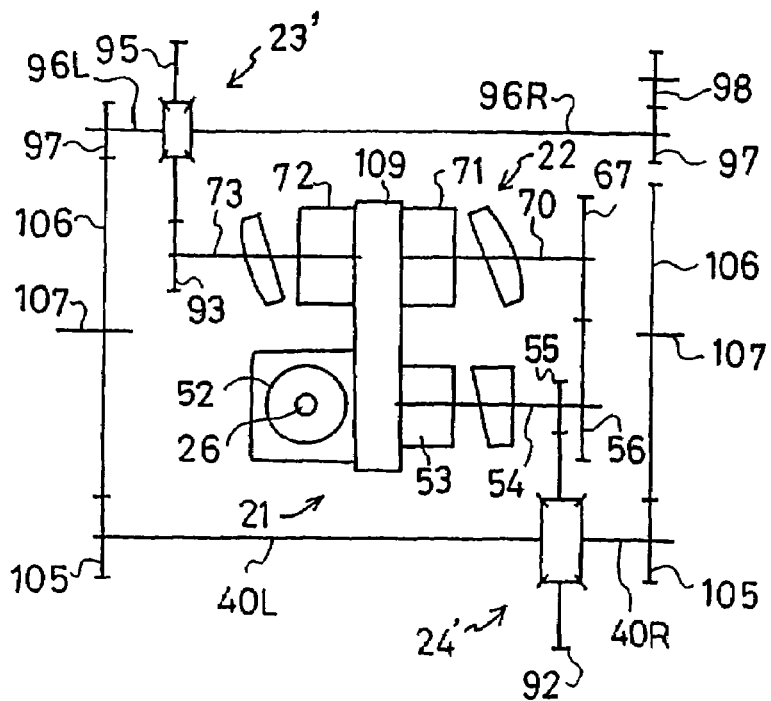
FIG. 19 is a diagram of a power transmitting system of a transmission in accordance with a seventh embodiment of the present invention.

In accordance with a seventh embodiment shown in FIG. 19, transmission 2 is compact and mechanically simplified. The hydraulic pumps and hydraulic motors of both of first and second HSTs 21 and 22 are fitted onto a common center section 109. In this embodiment the hydraulic pump and hydraulic motor of the same HST are disposed respectively on both surfaces of the center section 109 opposite to each other. In particular, on one surface of the center section 109 are fitted hydraulic pump 52 of first HST 21 and hydraulic motor 72 of second HST 22, and on the opposite surface of center section 109 are fitted hydraulic motor 53 of first HST 21 and hydraulic pump 71 of second HST 22. Traveling drive gear 55 and Steering drive gear 56 are fixed on motor shaft 54 of hydraulic motor 53. Traveling drive gear 55 directly engages with differential ring gear 92 of first differential 24' and steering drive gear 56 engages with input gear 67 fixed on input gear 70 of hydraulic pump 71 on the same side with hydraulic motor 53. Plain gear 93 fixed on motor shaft 73 directly engages differential ring gear 95 of second differential 23'. The construction for power transmitting to the axles 107 and the construction for steering are similar with those of the sixth embodiment. The HSTs 21 and 22 are surrounded by differential output shafts 40 and 96 and speed reduction gears 105 and 106, thereby providing a compact transmission 2.

Figure 20:
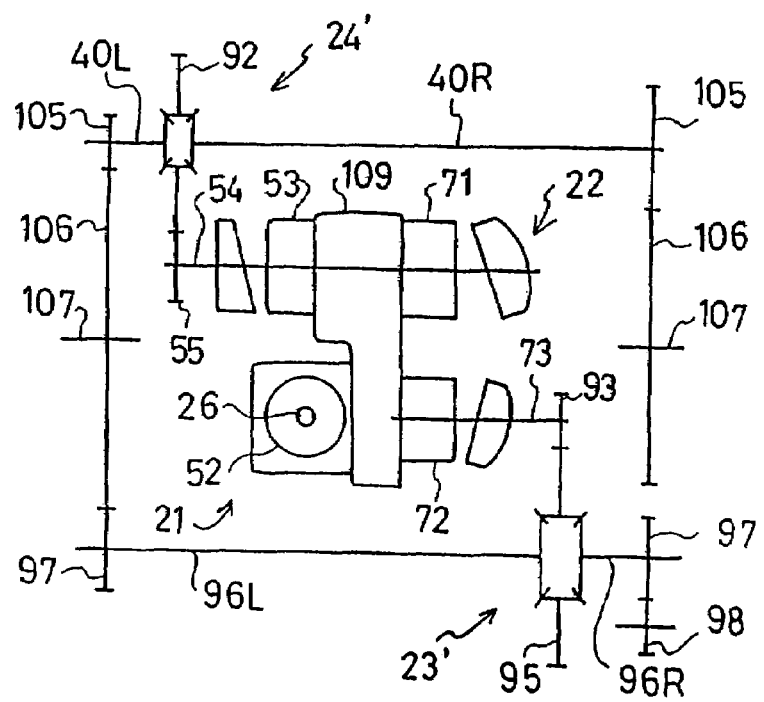
FIG. 20 is a diagram of a power transmitting system of a transmission in accordance with an eighth embodiment of the present invention.

Transmission 2 in accordance with an eighth embodiment, as shown in FIG. 20, is similar to that of the seventh embodiment in that first and second HSTs 21 and 22 are fitted to common center section 109 and are surrounded by shafts 40 and 96 and gears 105 and 106. However, in this embodiment, hydraulic pump 52 and hydraulic motor 53 of first HST 21 are fitted on one surface of center section 109 and hydraulic pump 71 and hydraulic motor 72 of second HST 22 are fitted on the opposite surface of center section 109. Motor shaft 54 is in common with the pump (input) shaft of second HST 22, thereby omitting gears 56 and 67. First differential 24' between shaft 54 and shafts 40, second differential 23' between shaft 73 and shafts 96 and the speed reduction gears between shafts 96 and shafts 40 are similar to those of the seventh embodiment.

Figure 21:
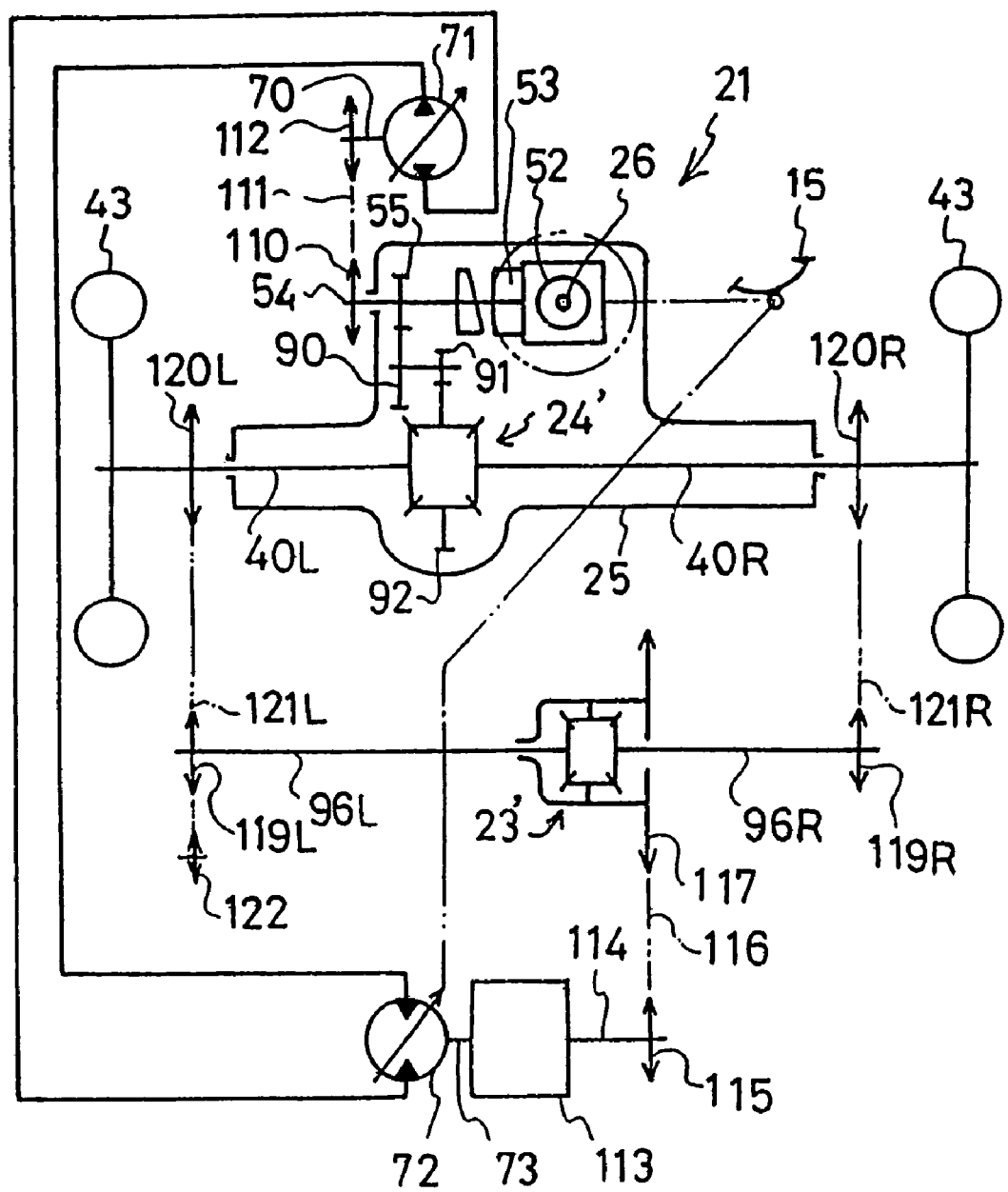
FIG. 21 is a diagram of a power transmitting system of a transmission in accordance with a ninth embodiment of the present invention.

Referring to transmission 2 in accordance with a ninth embodiment shown in FIG. 21, first HST 21 and first differential 24' for speed changing are contained in housing 25. Second HST 22 and second differential 23' for steering are disposed outside housing 25 or are attached to an exterior thereof. Sprockets and chains instead of gears are used for the power transmitting mechanism from HSTs 21 and 22 to differentials 24' and 23'.

In housing 25, traveling drive gear 55 fixed on motor shaft 54 of first HST 21 engages with differential ring gear 92 of differential 24' through gears 90 and 91. At the outside of housing 25, a chain 111 is interposed between a sprocket 110 fixed on shaft 54 projecting from housing 25 and a sprocket 112 fixed on input shaft 71 projecting therefrom, whereby power is transmitted from first HST 21 to second HST 22.

Outside housing 25, motor shaft 73 of second HST 22 is drivingly connected with a decelerator 113. A sprocket 115 is fixed onto an output shaft 114 of decelerator 113. A sprocket 117 is fixed onto a differential casing of differential 23'. A chain 116 is interposed between sprockets 115 and 117, thereby transmitting power from second HST 22 to differential 23'.

A pair of sprockets 119L and 119R are fixed onto outside portions of second differential output shafts 96L and 96R of differential 23', and a pair of sprockets 120L and 12OR are fixed onto outside portions of first differential output shafts 40L and 40R. A chain 12IR is interposed between sprockets 119R and 120R, so as to rotate both of them in the same direction. A sprocket 122 is rotatably disposed outside either sprocket 119L or sprocket 120L. If sprocket 122 is disposed outside sprocket 119L, for example, sprocket 119L is positioned between sprockets 120L and 122. A chain 121L is interposed between sprocket 122 and the outside sprocket 119L or 120L. The other intermediate sprocket 120L or 119L engages with an intermediate portion of chain 121L. Thus, sprockets 119L and 120L are rotated in opposite directions, whereby shaft 40L is rotated in the opposite direction of shaft 96L. Sprocket 122 may engage with the chain 12IR instead of the chain 121L. In this case, left shafts 96L and 40L are rotated in the same direction and right shafts 96R and 40R are rotated in opposite directions.

As described above, transmission 2 of the a embodiment using the sprockets and chains has the same effect as using gear trains.

Referring to FIGS. 2, 11 and 18, there are respectively shown three types arrangements of first and second HSTs 21 and 22 and first and second differentials 24 and 23 (24' and 23') in relation to housing 25. In FIG. 2, HSTs 21 and 22 and differentials 24 and 23 (24' and 23') are contained in housing 25. In FIG. 11, HSTs 21 and 22 are disposed outside housing 25 and differentials 24 and 23 (24' and 23') are contained in housing 25. In FIG. 18, HST 21 and differential 24' (24) for speed changing are contained in housing 25 and HST 22 and differential 23' (23) for steering are disposed outside housing 25. Each of transmissions 2 described above in the first through the ninth embodiments may employ any of the three arrangements described.

Additionally, contrary to the arrangement shown in FIG. 11, transmission 2 may be constructed such that HSTs 21 and 22 are contained in housing 25 and differentials 24 and 23 (24' and 23') are disposed outside. Also, contrary to the arrangement shown in FIG. 18, HST 21 and differential 24' (24) for speed changing may be disposed outside housing 25 and HST 22 and differential 23' (23) for steering may be contained in housing 25. Otherwise, only one of HSTs 21 and 22 may be disposed outside the housing 25, wherein the other of HSTs 21 or 22 and differentials 24 and 23 (24' and 23') are contained therein.

One skilled in the art would recognize that each of transmissions 2 between the third and the ninth embodiments shown in FIGS. 14 through 21 can employ the linkage shown in FIG. 6 and 7, so as to make the sensitivity of replication of turning correspond to the steering angle. It will be also recognized that each of them can employ the linkage shown in FIG. 9 or that shown in FIGS. 12 and 13, so as to make the turning radius correspond to the traveling speed of the vehicle. Motors 72 of variable capacity type shown in FIGS. 15, 16 and 21 may be replaced for those of fixed capacity type, thereby employing the linkage shown in FIGS. 12 and 13.

The transmission of the present invention can be adapted to a working vehicle like a small mower tractor which needs to be compact, requires a small turning radius and needs to be operated for speed changing and steering as easily as a passenger car.

What is claimed is:

1. A working vehicle, comprising:
a vehicle chassis;
a prime mover supported by said vehicle chassis;
a caster supported by said vehicle chassis;
a pair of drive wheels supported by said vehicle chassis;
a seat supported by said vehicle chassis between said caster and said drive wheels;
a steering wheel supported by said vehicle chassis in front of said seat;
a foot control pedal supported by said vehicle chassis;
a transmission casing fixed to said vehicle chassis; and
a transmission disposed within said transmission casing for drivingly connecting said prime mover and said pair of drive wheels with each other, said transmission including a first driving unit operatively connected with said foot control pedal and with said pair of drive wheels such that an output of said first driving unit drives each of said pair of drive wheels forwardly and backwardly at various speeds according to operation of said foot control pedal, and a second driving unit operatively connected with said steering wheel, wherein mutually relative speeds of said drive wheels can be changed according to operation of said steering wheel.

2. The working vehicle as set forth in claim 1, wherein said transmission comprises a hydrostatic stepless transmission including a hydraulic pump and a hydraulic motor fluidly connected with each other.

3. The working vehicle as set forth in claim 1, said steering wheel being rotatable in opposite directions from a neutral position, further comprising:
a system for selecting one of opposite output rotation directions of said second driving unit relative to each of the opposite rotation directions of said steering wheel from said neutral position due to whether said foot control pedal is depressed in a direction for forward traveling or in another direction for backward traveling.

4. A working vehicle, comprising:
a vehicle chassis;
a prime mover supported by a rear portion of said vehicle chassis;
a caster supported by said vehicle chassis;
a pair of drive wheels supported by said vehicle chassis, said pair of drive wheels being nearer to said prime mover than said caster;
a seat supported by said vehicle chassis between said caster and said drive wheels;
a steering wheel supported by said vehicle chassis in front of said seat;
a foot control pedal supported by said vehicle chassis;
a transmission casing fixed to said vehicle chassis; and
a transmission disposed within said transmission casing for drivingly connecting said prime mover and said pair of drive wheels with each other, said transmission including a first driving unit operatively connected with said foot control pedal and with said pair of drive wheels such that an output of said first driving unit drives each of said pair of drive wheels forwardly and backwardly at various speeds according to operation of said foot control pedal, and a second driving unit operatively connected with said steering wheel, wherein mutually relative speeds of said drive wheels can be changed according to operation of said steering wheel.

5. The working vehicle as set forth in claim 4, wherein said transmission comprises a hydrostatic stepless transmission including a hydraulic pump and a hydraulic motor fluidly connected with each other.

6. The working vehicle as set forth in claim 4, said steering wheel being rotatable in opposite directions from a neutral position, further comprising:
a system for selecting one of opposite output rotation directions of said second driving unit relative to each of the opposite rotation directions of said steering wheel from said neutral position due to whether said foot control pedal is depressed in a direction for forward traveling or in another direction for backward traveling.

7. A working vehicle, comprising:
a vehicle chassis;
a prime mover supported by said vehicle chassis;
a caster supported by said vehicle chassis;
a pair of drive wheels supported by said vehicle chassis;
a seat supported by said vehicle chassis between said caster and said drive wheels;
a steering wheel supported by said vehicle chassis in front of said seat;
a foot control pedal supported by said vehicle chassis;
a transmission casing fixed to said vehicle chassis; and
first and second hydrostatic stepless transmissions disposed within said transmission casing for drivingly connecting said prime mover and said pair of drive wheels with each other, said first hydrostatic stepless transmission operatively connected with said foot control pedal and with said pair of drive wheels, and said second hydrostatic stepless transmission operatively connected with said steering wheel, wherein an output of said first hydrostatic stepless transmission drives each of said pair of drive wheels forwardly and backwardly at various speeds according to operation of said foot control pedal, and said second hydrostatic stepless transmission is constructed such that mutually relative speeds of said drive wheels can be changed according to operation of said steering wheel.

8. The working vehicle as set forth in claim 7, said steering wheel being rotatable in opposite directions from a neutral position, further comprising:

a system for selecting one of opposite output rotation directions of said second hydrostatic stepless transmission relative to each of the opposite rotation directions of said steering wheel from said neutral position due to whether said foot control pedal is depressed in a direction for forward traveling or in another direction for backward traveling.

9. A working vehicle, comprising:
a vehicle chassis;
a prime mover supported by a rear portion of said vehicle chassis;
a caster supported by said vehicle chassis;
a pair of drive wheels supported by said vehicle chassis, said pair of drive wheels being nearer to said prime mover than said caster;
a seat supported by said vehicle chassis between said caster and said drive wheels;
a steering wheel supported by said vehicle chassis in front of said seat;
a foot control pedal supported by said vehicle chassis;
a transmission casing fixed to said vehicle chassis; and
first and, second hydrostatic stepless transmissions disposed within said transmission casing for drivingly connecting said prime mover and said pair of drive wheels with each other, said first hydrostatic stepless transmission operatively connected with said foot control pedal and with said pair of drive wheels, and said second hydrostatic stepless transmission operatively connected with said steering wheel, wherein an output of said first hydrostatic stepless transmission drives each of said pair of drive wheels forwardly and backwardly at various speeds according to operation of said foot control pedal, and said second hydrostatic stepless transmission is constructed such that mutually relative speeds of said drive wheels can be changed according to operation of said steering wheel.

10. The working vehicle as set forth in claim 9, said steering wheel being rotatable in opposite directions from a neutral position, further comprising:

a system for selecting one of opposite output rotation directions of said second hydrostatic stepless transmission relative to each of the opposite rotation directions of said steering wheel from said neutral position due to whether said foot control pedal is depressed in a direction for forward traveling or in another direction for backward traveling.

11. A working vehicle, comprising:
a vehicle chassis;
a prime mover supported by said vehicle chassis;
a caster supported by said vehicle chassis;
a pair of drive wheels supported by said vehicle chassis;
a seat supported by said vehicle chassis between said caster and said drive wheels;
a steering wheel supported by said vehicle chassis in front of said seat;
a foot control pedal supported by said vehicle chassis;
a common transmission casing fixed to said vehicle chassis; and
a transmission for drivingly connecting said prime mover and said pair of drive wheels with each other, said transmission including a first driving unit operatively connected with said foot control pedal and with said pair of drive wheels such that an output of said first driving unit drives each of said pair of drive wheels forwardly and backwardly at various speeds according to operation of said foot control pedal, and a second driving unit operatively connected with said steering wheel, wherein mutually relative speeds of said drive wheels can be changed according to operation of said steering wheel.

12. The working vehicle as set forth in claim 11, wherein said transmission comprises a hydrostatic stepless transmission including a hydraulic pump and a hydraulic motor fluidly connected with each other.

13. The working vehicle as set forth in claim 11, said steering wheel being rotatable in opposite directions from a neutral position, further comprising:

a system for selecting one of opposite output rotation directions of said second hydrostatic stepless transmission relative to each of the opposite rotation directions of said steering wheel from said neutral position due to whether said foot control pedal is depressed in a direction for forward traveling or in another direction for backward traveling.

14. The working vehicle as set forth in claim 11, wherein said transmission is disposed outside of said common transmission casing.

15. The working vehicle as set forth in claim 11, wherein said transmission is disposed within said common transmission casing.

16. A working vehicle, comprising:
a vehicle chassis;
a prime mover supported by a rear portion of said vehicle chassis;
a caster supported by said vehicle chassis;
a pair of drive wheels supported by said vehicle chassis, said pair of drive wheels being nearer to said prime mover than said caster;
a seat supported by said vehicle chassis between said caster and said drive wheels;
a steering wheel supported by said vehicle chassis in front of said seat;
a foot control pedal supported by said vehicle chassis;
a common transmission casing fixed to said vehicle chassis; and
a transmission for drivingly connecting said prime mover and said pair of drive wheels with each other, said transmission including a first driving unit operatively connected with said foot control pedal and with said pair of driving wheels such that an output of said first driving unit drives each of said pair of drive wheels forwardly and backwardly at various speeds according to operation of said foot control pedal, and a second driving unit operatively connected with said steering wheel, wherein mutually relative speeds of said drive wheels can be changed according to operation of said steering wheel.

17. The working vehicle as set forth in claim 16, wherein said transmission comprises a hydrostatic stepless transmission including a hydraulic pump and a hydraulic motor fluidly connected with each other.

18. The working vehicle as set forth in claim 16, said steering wheel being rotatable in opposite directions from a neutral position, further comprising:

a system for selecting one of opposite output rotation directions of said second hydrostatic stepless transmission relative to each of the opposite rotation directions of said steering wheel from said neutral position due to whether said foot control pedal is depressed in a direction for forward traveling or in another direction for backward traveling.

19. The working vehicle as set forth in claim 16, wherein said transmission is disposed outside of said common transmission casing.

20. The working vehicle as set forth in claim 16, wherein said transmission is disposed within said common transmission casing.

* * * * *